US012689997B2

(12) United States Patent (10) Patent No.: US 12,689,997 B2
Fouad et al. (45) Date of Patent: Jul. 21, 2026

(54) SIDELINK SYNCHRONIZATION FOR INTRA-BAND COEXISTENCE

(71) Applicant: Samsung Electronics Co., Ltd., Gyeonggi-do (KR)

(72) Inventors: Yaser Mohamed Mostafa Kamal Fouad, San Diego, CA (US); Philippe Jean Marc Michel Sartori, Naperville, IL (US)

(73) Assignee: Samsung Electronics Co., Ltd. (KR)

( * ) Notice: Subject to any disclaimer, the term of this patent is extended or adjusted under 35 U.S.C. 154(b) by 446 days.

(21) Appl. No.: 18/111,177

(22) Filed: Feb. 17, 2023

(65) Prior Publication Data

US 2023/0337159 A1 Oct. 19, 2023

Related U.S. Application Data

(60) Provisional application No. 63/330,879, filed on Apr. 14, 2022.

(51) Int. Cl.
*H04W 56/00* (2009.01)
*H04L 5/00* (2006.01)

(52) U.S. Cl.
CPC ....... *H04W 56/0015* (2013.01); *H04L 5/0051* (2013.01)

(58) Field of Classification Search
CPC . H04W 56/0015; H04W 56/001; H04W 4/40; H04W 72/1215; H04W 72/25;

(Continued)

(56) References Cited

U.S. PATENT DOCUMENTS 9,532,325 B2 12/2016 Chiu
10,785,735 B2 9/2020 Chervyakov et al.
(Continued)

FOREIGN PATENT DOCUMENTS

CN 112314013 2/2021
CN 112703786 4/2021
(Continued)

OTHER PUBLICATIONS

LG Electronics, "New WID on NR Sidelink Enhancement", RP-193231, 3GPP TSG RAN Meeting #86, Dec. 9-12, 2019, 6 pages.
(Continued)

*Primary Examiner* — Eric Myers
(74) *Attorney, Agent, or Firm* — The Farrell Law Firm, P.C.

(57) ABSTRACT

A system and a method are disclosed for synchronization performed by a UE in a coexistence band of a first communication scheme and a second communication scheme. A method includes determining if a base station or another UE synchronized with the base station is detected, in response to determining that neither the base station nor the another UE synchronized with the base station is detected, determining if a first UE that is resending a first synchronization reference signal based on a second synchronization reference signal of the second communication scheme is detected, wherein the first UE includes a modem corresponding to the first communication scheme, and in response to detecting the first UE that is resending the first synchronization reference signal, synchronizing to the first UE.

20 Claims, 14 Drawing Sheets

(58) Field of Classification Search
CPC ...... H04W 92/18; H04L 5/0051; H04L 7/041;
H04L 5/0048; G01S 19/24
See application file for complete search history.

(56) References Cited

U.S. PATENT DOCUMENTS

| 11,115,947 B2 | 9/2021 | Chervyakov et al. |
| 2017/0289870 A1 | 10/2017 | Liu et al. |
| 2019/0174444 A1 | 6/2019 | Li et al. |
| 2020/0015214 A1 | 1/2020 | Si et al. |
| 2020/0245272 A1 | 7/2020 | Hong et al. |
| 2021/0250881 A1 | 8/2021 | Lee et al. |

FOREIGN PATENT DOCUMENTS

| KR | 1020200018118 | 2/2020 |
| TW | 202207725 | 2/2022 |

OTHER PUBLICATIONS

ETSI TS 138 213 V16.4.0, 5G; NR; Physical Layer Procedures for
Control (3GPP TS 38.213 Version 16.4.0 Release 16), Jan. 2021,
185 pages.
3GPP TR 37.985 V17.1.1, 3GPP, 3rd Generation Partnership Project; Technical Specification Group Radio Access Network; Overall
Description of Radio Access Network (RAN) Aspects for Vehicle-
to-everything (V2X) based on LTE and NR (Release 17), Mar. 2022,
38 pages.
Taiwanese Office Action dated Apr. 23, 2026 issued in counterpart
application No. 11520404760, 9 pages.

301 — NR UE with LTE modem is acting as syncref UE in coexistence band and no LTE syncref UE detected 303 — Monitor current or incoming LTE UEs 305 — Current or incoming LTE UE acting as syncref UE detected?

No

Yes

307 — Stop acting as a syncref UE and follow the LTE syncref UE

601 — NR UE without LTE modem

603 — NR UE synced to an NR UE resending LTE sync reference?

No → END

Yes →

605 — SSB signal strength < Threshold?

No → 609 — Do not resend sync signal

Yes → 607 — Resend sync signal 1 slot

SIDELINK SYNCHRONIZATION FOR INTRA-BAND COEXISTENCE

CROSS-REFERENCE TO RELATED APPLICATIONS

This application claims the priority benefit under 35 U.S.C. § 119(e) to U.S. Provisional Application No. 63/330,879, filed on Apr. 14, 2022, the disclosure of which is incorporated by reference in its entirety as if fully set forth herein.

TECHNICAL FIELD

The disclosure generally relates to long term evolution (LTE) vehicle to everything (V2X) and new radio (NR) V2X coexistence. More particularly, the subject matter disclosed herein relates to improving NR sidelink (SL) synchronization with an LTE SL on an overlapping carrier for coexistence.

SUMMARY

LTE V2X currently allows communication between nearby vehicles. These communication links allow vehicles to exchange basic safety messages to avoid potential accidents and/or to enhance user experiences by sharing information, such as real-time road characteristics (e.g., traffic). However, a drawback of LTE V2X is that it was designed only for periodic traffic and offers limited data rates.

To address these issues, NR V2X is being developed to support aperiodic traffic and data rate enhancements in order to support a wider variety of applications. NR Rel-16 and Rel-17 are expected to operate concurrently with LTE V2X on a separate band in order to widen the range of supported V2X applications.

When LTE and NR SLs operate in a joint manner, there should be a common synchronization (or sync) for NR and LTE; especially, when there is coexistence between LTE and NR on the same operating carrier.

While respective synchronization procedures for NR and LTE are available, which allow the creation of a synchronization cluster (with high probability) when each system is operating independently, if an NR UE is follow the current NR synchronization procedure, there is no guarantee that the NR UE will be synchronized with an LTE UE. This essentially prevents effective coexistence of NR and LTE UEs on the same carrier. Therefore, a need exists for an effective procedure for LTE and NR UEs synchronization with each other.

In addition, it is expected that some legacy devices will only have LTE V2X support and thus, they are not expected to detect the presence of NR devices. Thus, an NR operation should be transparent to the LTE UEs, and the NR UEs should be able to adapt their synchronization to the LTE UEs.

In view of the foregoing, systems and methods are described herein for improving the coexistence of LTE and NR devices, without significantly impacting the reliability of LTE transmissions.

Systems and methods are also described herein, wherein a synchronization source priority for an NR UE is provided on a shared carrier.

Systems and methods are also described herein, wherein changes in existing signals and channels are provided to support new synchronization rules.

Systems and methods are also described herein, wherein a procedure for synchronization alignment between a coexistence carrier and another NR carrier is provided.

Systems and methods are also described herein for transmission of SL synchronization signal blocks (S-SSBs) in the coexistence band.

Systems and methods are also described herein, which utilize UE capability exchange between NR UEs in order for the NR UEs to exchange indications of the presence of on-board LTE modems.

Systems and methods are also described herein, which allow NR UEs to adjust an order of synchronization sources when operating in a coexistence band to avoid having multiple synchronization clusters.

Systems and methods are also described herein, wherein an adaptive set of synchronization sources in which synchronization sources are ordered based on different factors, e.g., whether the gNBs/eNBs are synchronized or not, whether a global navigation satellite system (GNSS) is available or not, and/or whether NR and LTE UEs are in coverage or out of coverage.

Systems and methods are also described herein, wherein an LTE UE operates as a synchronization source for an NR UE in out of coverage scenarios.

Systems and methods are also described herein, which merge two synchronization clusters.

Systems and methods are also described herein for selecting time-frequency resources for transmitting an NR S-SSB in a coexistence band.

Systems and methods are also described herein for transmitting multiple time-domain consecutive repetitions of an S-SSB when an LTE subframe duration spans multiple slots.

Systems and methods are also described herein for preempting an NR S-SSB by LTE transmissions.

Systems and methods are also described herein for coordinated transmission of an S-SSB by an NR UE in a coexistence band and an NR licensed band in out of coverage scenarios.

Systems and methods are also described herein for transmission of multiple time-domain repetitions of SL synchronization signals by NR UEs for improving reliability of S-SSB transmissions and combating scenarios in which S-SSBs are pre-empted/collided by/with LTE transmissions.

The above approaches improve on previous methods because they allow NR UEs to identify the presence of an onboard LTE modem in neighboring UEs and accordingly adjust their synchronization sources.

The above approaches also improve on previous methods because they reduce the instances of multiple synchronization clusters in a coexistence band by allowing NR UEs to adjust an order of their synchronization sources, e.g., based on changes in their surrounding environment.

The above approaches also improve on previous methods because they offer multiple orders of synchronization sources based on an underlying scenario (e.g., a presence of GNSS) to avoid having multiple synchronization clusters.

The above approaches also improve on previous methods because they allow LTE UEs to act as a synchronization source for NR UEs.

The above approaches also improve on previous methods because they allow NR UEs to operate only in a coexistence band to be synchronized to their neighboring NR UEs by providing S-SSB transmissions in the coexistence band.

The above approaches also improve on previous methods because they reduce a processing complexity of decoding NR S-SSB transmissions in a coexistence band by fixing their location in a frequency domain.

The above approaches also improve on previous methods because they increase reliability of NR S-SSB transmissions in a coexistence band by transmitting multiple time-domain repetitions.

The above approaches also improve on previous methods because they reduce the impact of NR UEs on their LTE counterparts by allowing LTE UEs to pre-empt NR S-SSB transmissions in a coexistence band.

The above approaches also improve on previous methods because they merge NR synchronization clusters in licensed and coexistence bands through coordinated S-SSB transmissions by a synchronization reference UE.

In an embodiment, a method of synchronization performed by a UE is provided. The method includes determining if a base station or another UE synchronized with the base station is detected; in response to determining that neither the base station nor the another UE synchronized with the base station is detected, determining if a first UE that is resending a first synchronization reference signal based on a second synchronization reference signal of a second communication scheme is detected, wherein the second communication scheme is utilized in in a coexistence band of a first communication scheme and the second communication scheme, and wherein the first UE includes a modem corresponding to the first communication scheme; and in response to detecting the first UE that is resending the first synchronization reference signal, synchronizing to the first UE.

In an embodiment, a UE is provided. The UE includes a transceiver; and a processor configured to determine if a base station or another UE synchronized with the base station is detected, if neither the base station nor the another UE synchronized with the base station is detected, determine if a first UE that is resending a first synchronization reference signal based on a second synchronization reference signal of a second communication scheme is detected, wherein the second communication scheme is utilized in in a coexistence band of a first communication scheme and the second communication scheme, and wherein the first UE includes a modem corresponding to the first communication scheme, and if the first UE that is resending the first synchronization reference signal is detected, synchronize to the first UE.

In an embodiment, a UE is provided. The UE includes a transceiver; and a processor configured to determine if a first UE operating as a synchronization reference UE is detected, wherein the first UE includes a modem corresponding to the second communication scheme, and wherein the second communication scheme is utilized in in a coexistence band of a first communication scheme and the second communication scheme, and if the first UE operating as the synchronization reference UE is detected, synchronize to the first UE.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1A:
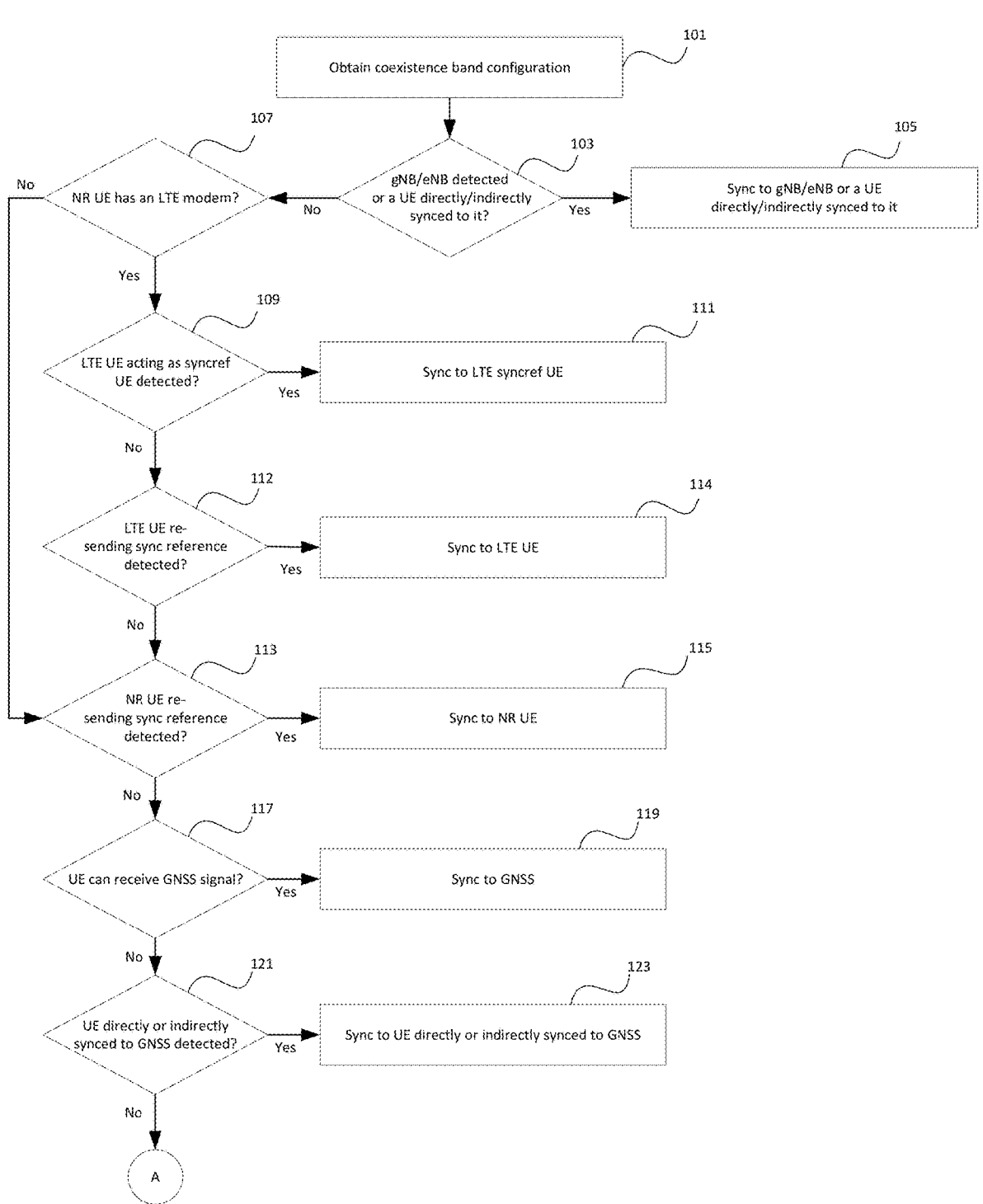
FIGS. 1A and 1B are a flowchart illustrating a synchronization procedure for an NR UE, when a GNSS is not configured as a synchronization source for LTE UEs, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.).

Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Although various embodiment of the disclosure are described below with reference to LTE and NR as different communication schemes of a coexistence band, the present disclosure is not limited to these specific communications schemes and may be applied to other communication schemes having similar features and configurations.

In NR and LTE systems, a UE first attempts to perform synchronization before transmitting or receiving any data. Synchronization is performed to acquire LTE subframe and NR slot boundaries. In addition, a UE is able to acquire a time division duplexing (TDD) configuration, as well as a direct frame number (DFN) and subframe number in case of LTE, and acquire the DFN and a slot index in case of NR.

Basically, for a communication system to operate most efficiently, all UEs should be synchronized to the same source. To achieve this, in both LTE and NR, possible synchronization sources are ordered based on priorities. Subsequently, when a UE attempts to synchronize, it follows the $3^{rd}$ generation partnership project (3GPP) specification to find its synchronization source. In particular, synchronization sources in case of LTE are prioritized as shown in Table 1.

TABLE 1

| Order | Synchronization source |
|---|---|
| Level 1 | Either GNSS or eNB according to pre-configuration. |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | Any other Syncref UE. |
| Level 5 | UE's internal clock. |

In NR, synchronization sources are prioritized as shown in Table 2.

TABLE 2

| Order | Synchronization source |
|---|---|
| Level 1 | Either GNSS or eNB/gNB, according to (pre-)configuration. |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | Whichever of GNSS or eNB/gNB was not (pre-)configured as the Level 1 source. |
| Level 5 | A Syncref UE directly synchronized to a Level 4 source. |
| Level 6 | A Syncref UE synchronized to a Level 5 source, i.e., indirectly synchronized to a Level 4 source. |
| Level 7 | Any other Syncref UE. |
| Level 8 | UE's internal clock. |

As shown above, while Levels 1-3 in Tables 1 and 2 are very similar and Levels 4 and 5 of Table 1 are very similar to Levels 7 and 8 of Table 2, different than Table 1, Table 2 (i.e., NR) includes additional Levels 4-6, which essentially repeat Levels 1-3 for the GNSS or eNB/gNB that was not (pre-)configured as the Level 1 source.

Despite the importance of the above-described procedures, they were designed to work independently. In particular, NR V2X UEs were expected to operate in a licensed spectrum in which LTE UEs will not perform any transmissions. Similarly, NR V2X transmissions were not expected to coexist with LTE ones. Hence, in case of an out of coverage scenario, NR and LTE UEs may end up belonging to different synchronization clusters.

Accordingly, various of embodiments of the disclosure will be described below for improving NR SL synchronization with an LTE SL on an overlapping carrier for coexistence

Capability Signaling and Configuration Indication to NR UEs that Will Operate in a Coexistence Band To differentiate the four cases described above, i.e., whether a gNB and an eNB are synchronized or not and whether a GNSS is synchronized to any of them or not, in accordance with an embodiment of the disclosure, capability signaling and radio resource control (RRC) signaling are utilized for a UE to be aware of a synchronization order to follow.

However, as a UE does not necessarily exchange RRC signaling with another UE that it receives synchronization from, the indication of which of the four cases the UE operates in should be indicated from the synchronizations signals/channel.

For example, a new field may be added to a physical SL broadcast channel (PSBCH) to indicate whether an NR UE has an LTE modem or not and whether it is a simplified modem (i.e., only capable of receiving a synchronization signaling) or is capable of sending and receiving resource reservations in the band. This can be done using a 2-bit field in the PSBCH, e.g., the two reserved bits in the current PSBCH payload. This new field may also be limited to SSB transmissions that occur in the coexistence band.

As another method, a specific subset of SL synchronization signal identifiers (SLSSIDs) may be used to indicate the presence of an LTE modem or not and its capability. When using SLSSIDs, an indication of the presence of an LTE modem may be inferred if the SLSSIDs are sent in the coexistence band. That is, the use of a special subset of SLSSID to indicate the presence of LTE modems may be limited to the coexistence band and may be jointly used with an indication of a syncref type (e.g., an LTE syncref UE or an NR syncref UE) to identify a synchronization level.

As another method, RRC signaling indicating the presence of an LTE modem may also include an RRC capability signaling exchange in which an NR UE can share with its neighbors whether it has an LTE modem or not via RRC signaling. This method may be applied when two UEs are already communicating.

As another method, a 1st or 2nd stage SL control information (SCI) or a medium access control (MAC) control element (CE) may be used to indicate whether an LTE modem is present or not.

In addition, an NR UE should know an LTE synchronization order configuration as well as which of the following four cases is configured in order to correctly identify its synchronization order:

Case 1: gNB and eNB synchronized
Case 2: gNB and eNB not synchronized, gNB synchronized to GNSS timing
Case 3: gNB and eNB not synchronized, eNB synchronized to GNSS timing Case 4: gNB and eNB not synchronized, neither gNB nor eNB synchronized to GNSS timing To achieve this, if an NR UE is equipped with an LTE modem, the LTE modem configuration may be relied upon to know the configured synchronization order for LTE devices (i.e., whether the LTE UEs need to synchronize to GNSS or eNBs).

However, if the NR UE is not equipped with an LTE modem, it can rely on pre-configuration or RRC signaling to obtain the LTE synchronization order.

The NR UE can also rely on pre-configuration or RRC signaling to identify whether the gNBs/eNBs are synchronized or not, and whether the GNSS is synchronized to gNBs and/or eNBs.

In accordance with the above described embodiments, an NR UE may use a new 1 or 2-bit field in a PSBCH to indicate whether it has an LTE modem or not, and whether this LTE modem has sensing capabilities or not. Additionally, this field may be limited to a coexistence band.

An NR UE may also use a subset of an SLSSID when transmitting SSBs in a coexistence band to indicate whether it has an LTE modem or not.

An NR UE may also rely on RRC signaling, 1st or 2nd stage SCI, or MAC CE to indicate whether it has an LTE modem or not, and whether this modem has sensing capabilities or not.

An NR UE, if equipped with an LTE modem, may also use the LTE modem configuration to determine an LTE synchronization source selection order and accordingly identify a synchronization source selection order it should follow when operating in a coexistence band.

An NR UE may be provided, through RRC signaling or pre-configuration, a synchronization source selection order for LTE UEs and whether gNBs/eNBs are synchronized or not and whether a GNSS is synchronized to gNBs and/or eNBs.

gNB/eNB Synchronized and Using GNSS Timing

In this section, it is assumed that a gNB and an eNB are synchronized. That is, if NR UEs are synchronized to the gNBs and LTE UEs are synchronized to the eNBs, then only one synchronization cluster will exist and the NR and LTE UEs will be synchronized with each other. It is also assumed that a GNSS is synchronized with both the gNBs and the eNBs.

If an NR UE wants to operate in the coexistence band, it should abide with an order of synchronization sources, which is different from that when operating in the NR band. In particular, when a GNSS is configured as a synchronization source for LTE UEs, the synchronization order shown in Table 3 may be followed to ensure the existence of one synchronization cluster when the NR UE has an LTE modem that can be used to synchronize to an LTE syncref UE.

TABLE 3

| Order | Synchronization source |
|---|---|
| Level 1 | GNSS |
| Level 2 | A syncref UE directly synchronized to a Level 1 source. |
| Level 3 | A syncref UE synchronized to a Level 2 source, i.e., indirectly synchronized to a Level 1 source. |
| Level 4 | LTE Syncref UE |
| Level 5 (optional) | A syncref UE (either NR or LTE UE) directly synchronized to a Level 4 source. |

TABLE 3-continued

| Order | Synchronization source |
|---|---|
| Level 6 (optional) | A syncref UE synchronized to a Level 5 source, i.e., indirectly synchronized to a Level 4 source. |
| Level 7 | eNB/gNB |
| Level 8 | A Syncref UE directly synchronized to a Level 7 source. |
| Level 9 | A Syncref UE synchronized to a Level 8 source, i.e., indirectly synchronized to a Level 7 source. |
| Level 10 | Any other NR Syncref UE. |
| Level 11 | UE's internal clock. |

As shown in Table 3, the NR UE synchronizes to a GNSS, if available (Level 1), then to UEs directly synchronized to the GNSS (Level 2), and then to UEs indirectly synchronized to the GNSS (Level 3). This is similar to an SL LTE UE procedure when a GNSS is configured as the synchronization source for LTE UEs.

However, if no Level 3 synchronization source can be found, then there is neither direct nor indirect access to a GNSS synchronization source. As such, the NR UE synchronizes to an existing LTE syncref UE (Level 4), or (optionally) to a LTE directly (Level 5) or indirectly (Level 6) synchronized with an LTE synchronization source.

If no LTE source can be obtained through Level 6, the UE uses a gNB as a synchronization source in Levels 7-9. This ensures that there can at least be a gNB synchronization cluster before the NR UE attempts to synchronize to either an NR syncref UE or become a syncref UE itself.

However, when a GNSS is not configured as a synchronization source for LTE UEs, but an eNB is synchronized to the GNSS, the synchronization order as shown in Table 4 may be followed to ensure the existence of one synchronization cluster in a coexistence band.

TABLE 4

| Order | Synchronization source |
|---|---|
| Level 1 | eNB/gNB. |
| Level 2 | A syncref UE directly synchronized to a Level 1 source. |
| Level 3 | A syncref UE synchronized to a Level 2 source, i.e., indirectly synchronized to a Level 1 source. |
| Level 4 | LTE Syncref UE |
| Level 5 (optional) | A syncref UE (NR or LTE UE) directly synchronized to a Level 4 source. |
| Level 6 (optional) | A syncref UE synchronized to a Level 5 source, i.e., indirectly synchronized to a Level 4 source. |
| Level 7 | GNSS |
| Level 8 | A syncref UE directly synchronized to a Level 7 source. |
| Level 9 | A syncref UE synchronized to a Level 8 source, i.e., indirectly synchronized to a Level 7 source. |
| Level 10 | Any other syncref UE. |
| Level 11 | UE's internal clock. |

The priority order of synchronization sources in Table 4 follows the same principles as described above with reference to Table 3.

When an NR UE does not have an LTE modem, it can select the synchronization source according to the order shown in the Table 5 below, when a GNSS is configured as a synchronization source for LTE UEs.

TABLE 5

| Order | Synchronization source |
|---|---|
| Level 1 | GNSS |
| Level 2 | A syncref UE directly synchronized to a Level 1 source. |
| Level 3 | A syncref UE synchronized to a Level 2 source, i.e., indirectly synchronized to a Level 1 source. |
| Level 4 | A syncref UE directly synchronized to an LTE syncref UE. |
| Level 5 (optional) | A syncref UE synchronized to a Level 5 source. |
| Level 6 | eNB/gNB |
| Level 7 | A syncref UE directly synchronized to a Level 6 source. |
| Level 8 | A syncref UE synchronized to a Level 7 source, i.e., indirectly synchronized to a Level 6 source. |
| Level 9 | Any other syncref UE |
| Level 10 | UE's internal clock. |

Similarly, when GNSS is not configured as the synchronization source for LTE UES and when the NR UE does not have an LTE modem, the following order can be considered for the synchronization sources.

TABLE 6

| Order | Synchronization source |
|---|---|
| Level 1 | eNB/gNB. |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | A Syncref UE directly synchronized to an LTE syncref UE |
| Level 5 (Optional) | A Syncref UE synchronized to a Level 5 source, i.e. indirectly synchronized to a Level 4 source. |
| Level 6 | GNSS |
| Level 7 | A Syncref UE directly synchronized to a Level 6 source. |
| Level 8 | A Syncref UE synchronized to a Level 7 source, i.e., indirectly synchronized to a Level 6 source. |
| Level 9 | Any other Syncref UE |
| Level 10 | UE's internal clock. |

Additionally or alternatively, the following limitations may be applied if an NR UE is equipped with an LTE modem:

All NR UEs may be restricted from using a coexistence band if not synchronized to an eNB/gNB or a GNSS, if the GNSS is configured as a synchronization source for LTE UEs.

When an NR UE has an LTE modem, then it may be assumed that the NR UE will continuously monitor for LTE UEs, if its synchronization source level is higher than Level 6 and a GNSS is not configured as a synchronization source for LTE UEs, or if its synchronization source level is higher than level 9.

If an NR UE having an LTE modem cannot find an LTE syncref UE, then it may be expected that the NR UE monitors for another NR UE retransmitting an LTE synchronization signal (i.e., an NR UE that is either directly or indirectly connected to an LTE syncref UE). In other words, the NR UE should connect to a Level 5/6 synchronization source. If this other NR UE is identified, then the NR UE should attempt to synchronize with it in order to avoid having multiple synchronization clusters.

However, if an NR UE does not have an LTE modem, the following limitations may be applied:

NR UEs without LTE modems may be restricted from using a coexistence band to avoid causing interference to the LTE UEs. This may be done by resource pool configuration.

NR UEs without LTE modems may be restricted from using a coexistence band if not synchronized to an eNB/gNB or a GNSS, if it is configured as the LTE synchronization source. This also may be done by resource pool configuration.

NR UEs without LTE modems may be allowed to use a coexistence band if following an NR syncref UE with an LTE modem.

NR UEs without LTE modems may be allowed to operate in a coexistence band if their synchronization source level is below Level 9 and a GNSS is configured, or if their synchronization source level is below Level 6. This may also be done by resource pool configuration.

NR UEs without LTE modems that are synchronized to a Level 9 source may be allowed to operate in a coexistence band if their synchronization source has an LTE modem. This may be indicated as part of a PSBCH, by using reserved SL-primary synchronization signal (PSS)/SL-secondary synchronization signal (SSS) sequences, by UE capability exchange, or by RRC configuration.

An NR UE acting as a syncref UE may be expected to provide an indication on whether it has an LTE modem and whether it is capable of receiving LTE syncref signals or not.

If an NR UE is acting as a syncref UE in an NR band, but does not have an LTE modem, then it is expected to react when it receives a notification from a neighboring UE of the presence of LTE UEs in coexistence band. In this case, the NR UE may stop acting as the syncref UE and may switch to follow another NR UE. This can be beneficial when an NR syncref UE is transmitting in the NR band and the following NR UEs with LTE modem are operating in the coexistence band. In such a case, when LTE UEs exist, the two synchronization clusters should be aligned. This approach is also backward compatible since it is expected that an NR syncref UE will be replaced with another UE that is able to detect LTE syncref signals and is able to merge the LTE and NR synchronization clusters into a single cluster and subsequently allow the NR UEs to operate in the coexistence band.

Figure 1B:
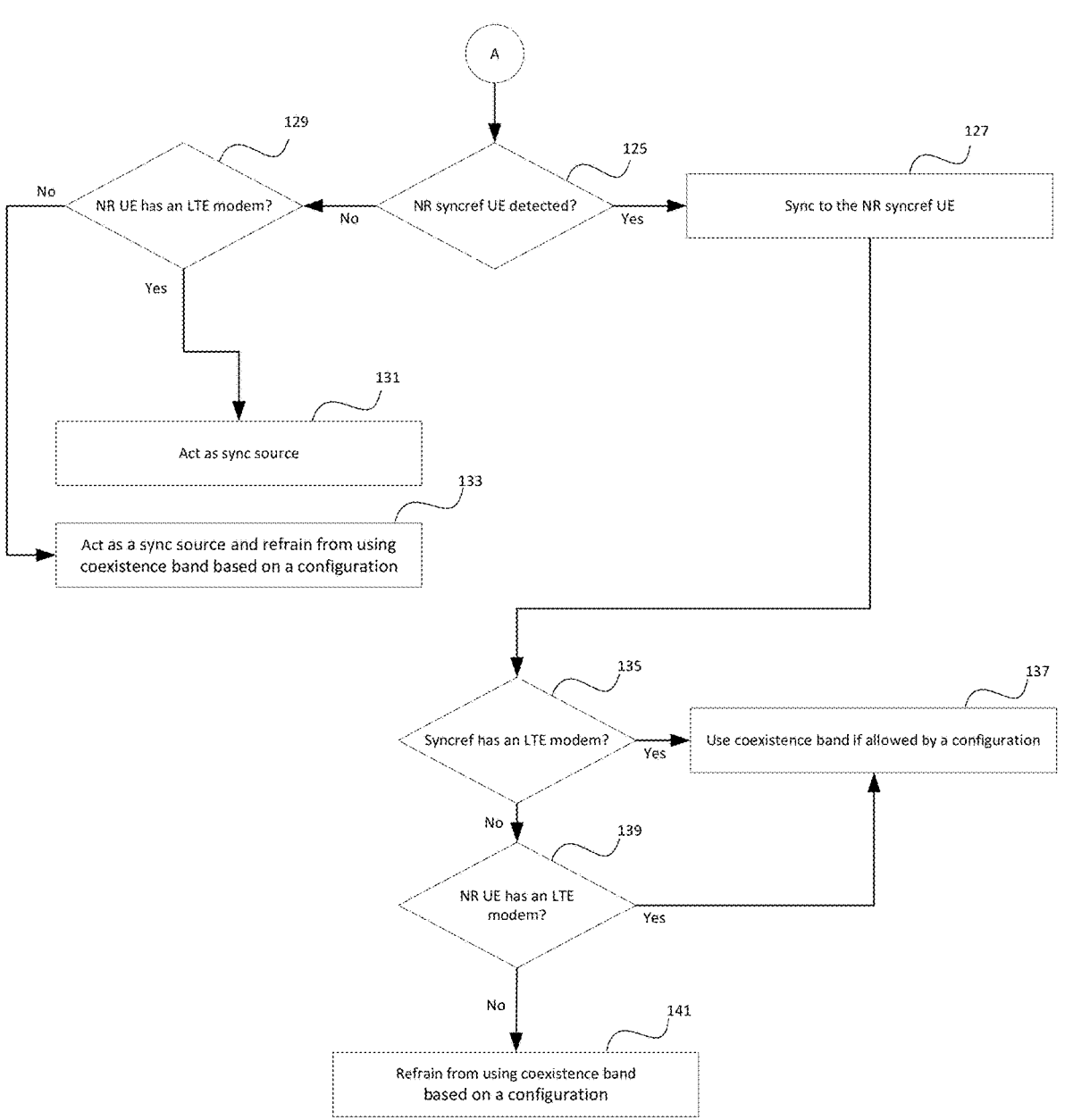

FIGS. 1A and 1B are a flowchart illustrating a synchronization procedure for an NR UE, when a GNSS is not configured as a synchronization source for LTE UEs, according to an embodiment. For example, the synchronization procedure illustrated in FIGS. 1A and 1B may follow Tables 4 and 6 above.

Referring to FIG. 1A, in step 101, the NR UE obtains a coexistence band configuration.

In step 103, the NR UE determines whether a gNB, an eNB, or a UE, which is directly or indirectly synced to the gNB or eNB, can be detected.

If a gNB, an eNB, or a UE, which is directly or indirectly synced to the gNB or eNB, can be detected in step 103, then the NR UE syncs to the detected gNB, eNB, or UE in step 105.

However, if neither a gNB, an eNB, nor a UE, which is directly or indirectly synced to the gNB or eNB, can be detected in step 103, then the NR UE determines whether it has an LTE modem in step 107.

When the NR UE has an LTE modem in step 107, the NR UE determines whether an LTE UE acting as a syncref UE can be detected via the LTE modem in step 109. When the NR UE detects an LTE UE acting as a syncref UE in step 109, the NR UE syncs to the LTE UE in step 111.

However, when the NR UE does not detect an LTE UE acting as a syncref UE in step 109, the NR UE determines whether an LTE UE that is resending an LTE sync reference signal can be detected in step 112. When the NR UE detects an LTE UE that is resending an LTE sync reference signal in step 112, the NR UE syncs to the LTE UE in step 114.

However, when the NR UE does not have an LTE modem in step 107 or when the NR UE does not detect an LTE UE that is resending an LTE sync reference signal in step 112, the NR UE determines whether an NR UE that is resending a sync reference signal based on an LTE sync signal can be detected in step 113.

When the NR UE detects an NR UE that is resending an sync reference signal in step 113, the NR UE syncs to the NR UE that is resending the sync reference signal in step 115. However, when the NR UE does not detect an NR UE that is resending a sync reference signal in step 113, the NR UE determines whether it can receive a GNSS signal in step 117.

When the NR UE determines that it can receive a GNSS signal in step 117, the NR UE syncs to the GNSS in step 119. However, when the NR UE determines that it cannot receive a GNSS signal in step 117, the NR UE determines whether a UE, which is directly or indirectly synced to the GNSS, is detected in step 121.

When a UE, which is directly or indirectly synced to the GNSS, is detected in step 121, the NR UE syncs to the detected UE in step 123.

Referring to FIG. 1B, when a UE, which is directly or indirectly synced to the GNSS, is not detected in step 121, the NR UE determines whether an NR syncref UE is detected in step 125.

When an NR syncref UE is detected in step 125, the NR UE syncs to the NR syncref UE in step 127.

However, when an NR syncref UE is not detected in step 125, the NR UE determines if it has an LTE modem in step 129. If the NR UE does not have an LTE modem in step 129, the NR UE will act as a sync source and refrain from using the coexistence band based on a configuration in step 133. If the NR UE has an LTE modem in step 129, the NR UE will act as a sync source and may use the coexistence band in step 131.

In step 135, after syncing to the NR syncref UE in step 127, the NR UE determines if the NR syncref UE has an LTE modem.

If the NR UE determines that the NR syncref UE has an LTE modem in step 135, the NR UE may use the coexistence band in step 137, if allowed by configuration.

However, if the NR UE determines that the NR syncref UE does not have an LTE modem in step 135, the NR UE determines if it has an LTE modem in step 139. If the NR UE does not have an LTE modem in step 139, the NR UE will refrain from using the coexistence band based on a configuration in step 141. If the NR UE has an LTE modem in step 139, the NR UE may use the coexistence band in step 137, if allowed by configuration.

Figure 2A:
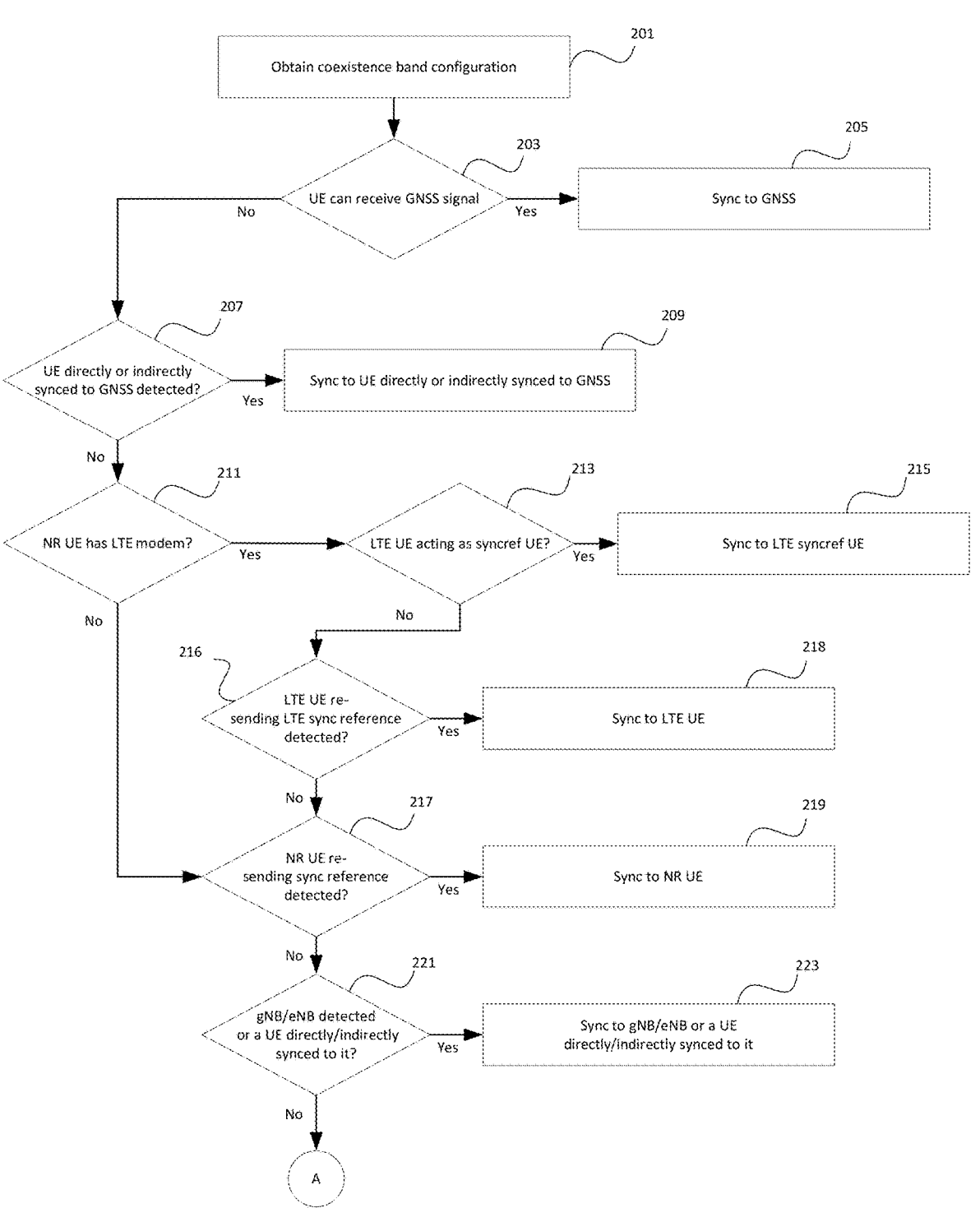
FIGS. 2A and 2B are a flowchart illustrating a synchronization procedure for an NR UE, when a GNSS is configured as a synchronization source for LTE UEs, according to an embodiment.
Figure 2B:
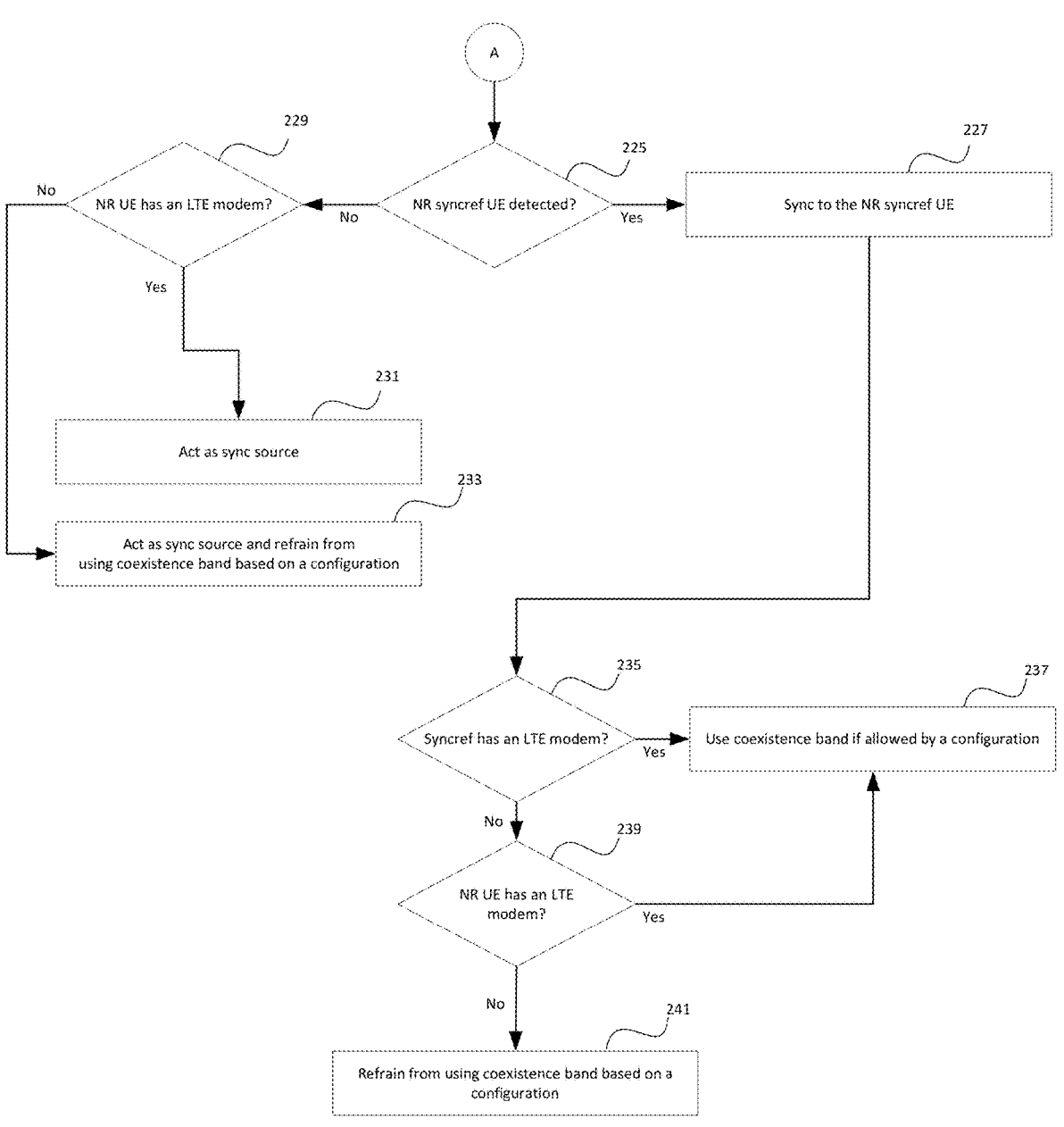

FIGS. 2A and 2B are a flowchart illustrating a synchronization procedure for an NR UE, when a GNSS is configured as a synchronization source for LTE UEs, according to an embodiment. For example, the synchronization procedure illustrated in FIGS. 2A and 2B may follow Tables 3 and 5 above.

Referring to FIG. 2A, in step 201, the NR UE obtains a coexistence band configuration.

In step 203, the NR UE determines whether it can receive a GNSS signal.

If a GNSS can be received in step 203, then the NR UE syncs to the GNSS in step 205. However, if a GNSS cannot be received in step 203, then the NR UE determines whether it has a UE, which is directly or indirectly synced to the GNSS, is detected in step 207.

When the NR UE detects a UE, which is directly or indirectly synced to the GNSS, in step 207, the NR UE syncs to the detected UE in step 209.

When the NR UE does not detect a UE, which is directly or indirectly synced to the GNSS, in step 207, the NR UE determines whether it has an LTE modem in step 211.

When the NR UE determines it has an LTE modem in step 211, the NR UE determines whether an LTE UE acting as a syncref UE can be detected via the LTE modem in step 213. When the NR UE detects an LTE UE acting as a syncref UE in step 213, the NR UE syncs to the LTE syncref UE in step 215.

However, when the NR UE does not detect an LTE UE acting as a syncref UE in step 213, the NR UE determines whether an LTE UE that is resending an LTE sync reference signal can be detected in step 216. When the NR UE detects an LTE UE that is resending an LTE sync reference signal in step 216, the NR UE syncs to the LTE UE in step 218.

However, when the NR UE does not have an LTE modem in step 211 or when the NR UE does not detect an LTE UE that is resending an LTE sync reference signal in step 216, the NR UE determines whether an NR UE that is resending a sync reference signal based on an LTE sync reference signal can be detected in step 217.

When the NR UE detects an NR UE that is resending an LTE sync reference signal in step 217, the NR UE syncs to the NR UE that is resending the LTE sync reference signal in step 219. However, when the NR UE does not detect an NR UE that is resending an LTE sync reference signal in step 217, the NR UE determines whether a gNB, an eNB, or a UE, which is directly or indirectly synced to the gNB or eNB, can be detected in step 221.

If a gNB, an eNB, or a UE, which is directly or indirectly synced to the gNB or eNB, can be detected in step 221, then the NR UE syncs to the detected gNB, eNB, or UE in step 223.

Referring to FIG. 2B, if neither a gNB, an eNB, nor a UE, which is directly or indirectly synced to the gNB or eNB, can be detected in step 221, then the NR UE determines whether an NR syncref UE is detected in step 225.

When an NR syncref UE is detected in step 225, the NR UE syncs to the NR syncref UE in step 227.

However, when an NR syncref UE is not detected in step 225, the NR UE determines if it has an LTE modem in step 229. If the NR UE does not have an LTE modem in step 229, the NR UE will act as a sync source and refrain from using the coexistence band based on a configuration in step 233. If the NR UE has an LTE modem in step 229, the NR UE will act as a sync source and may use the coexistence band in step 231.

In step 235, after syncing to the NR syncref UE in step 227, the NR UE determines if the NR syncref UE has an LTE modem.

If the NR UE determines that the NR syncref UE has an LTE modem in step 235, the NR UE may use the coexistence band in step 237, if allowed by configuration.

However, if the NR UE determines that the NR syncref UE does not have an LTE modem in step 235, the NR UE determines if it has an LTE modem in step 239. If the NR UE does not have an LTE modem in step 239, the NR UE will refrain from using the coexistence band based on a configuration in step 241. If the NR UE has an LTE modem in step 231, the NR UE may use the coexistence band in step 237, if allowed by configuration.

Incoming LTE UEs may also have an impact on the selected synchronization source.

In particular, if an NR UE has an LTE modem, then the NR UE may continuously monitor for incoming LTE UEs. If a new LTE is detected and becomes a syncref UE, then the NR UE may stop sending its SSB and follow the LTE UE in order to avoid having two synchronization clusters. This monitoring would not occur if the NR UE is synchronized to a GNSS and the GNSS is configured as a synchronization source for LTE UEs. In addition, this monitoring will not occur if the eNB is configured as the synchronization source for LTE UEs and the NR UE is synchronized to the eNB.

Figure 3:
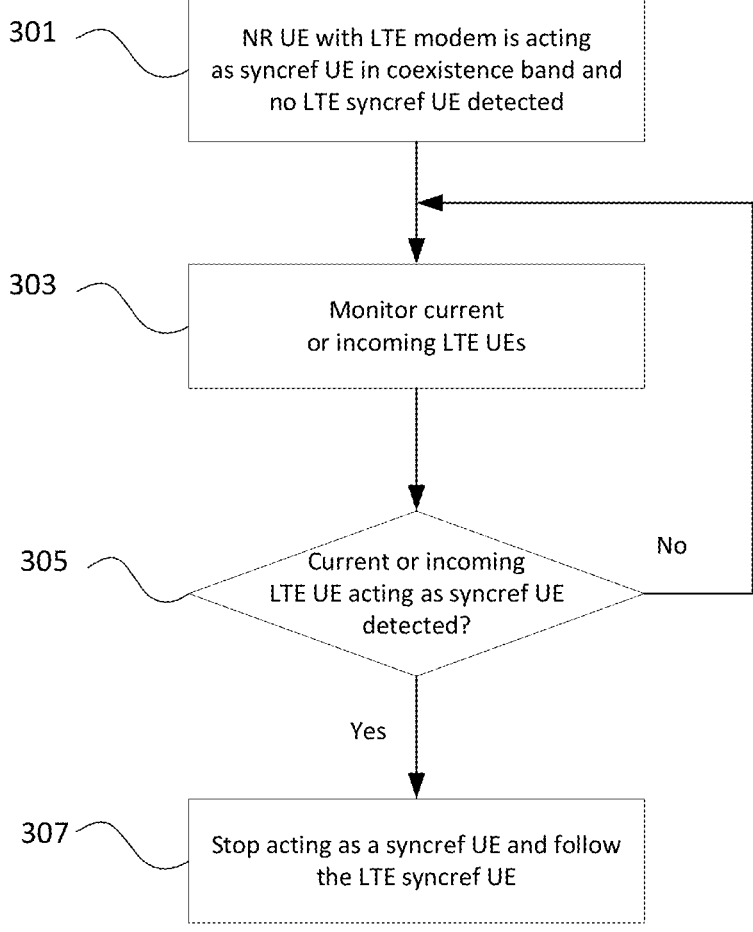
FIG. 3 is a flowchart illustrating a procedure for NR UEs to detect incoming LTE UEs, when operating in coexistence band, according to an embodiment.

FIG. 3 is a flowchart illustrating a procedure for NR UEs to detect incoming LTE UEs, when operating in coexistence band, according to an embodiment. Specifically, the procedure of FIG. 3 may be performed when a GNSS is configured as a synchronization source for LTE UEs.

Referring to FIG. 3, in step 301, an NR UE with an LTE modem is acting as a syncref UE in a coexistence band and no LTE syncref is detected.

In step 303, the NR UE monitors for current or incoming LTE UEs.

If a current or incoming LTE UE acting as a syncref UE is detected in step 305, then the NR UE stops acting as a syncref UE and follows the detected LTE syncref UR in step 307.

As another embodiment, if an NR UE is synchronized to an NR syncref UE without an LTE modem, the NR UE may notify the NR syncref UE of the presence of new LTE UEs. For example, this may be beneficial when the NR syncref UE is transmitting in the NR band, but the following NR UEs with LTE modems are operating in the coexistence band. In such a case, when the LTE UEs the two synchronization clusters should be aligned.

In this case, the NR UE can notify the NR syncref UE of the situation and the NR syncref UE can then refrain from transmitting a synchronized signal. To ensure backward compatibility, if the NR syncref UE is not a Rel-18 UE, then the following NR UEs with LTE modems may choose to operate only in one of the two bands (i.e., the coexistence or the dedicated NR band) because of the existence of the two synchronization clusters, if they can support only one synchronization source. Otherwise, if an NR UE with an LTE modem can support two synchronization sources, then it can operate in the coexistence band and in the NR band by synchronizing to the two synchronization sources (i.e., the LTE syncref UE and the NR syncref UE).

Figure 4:
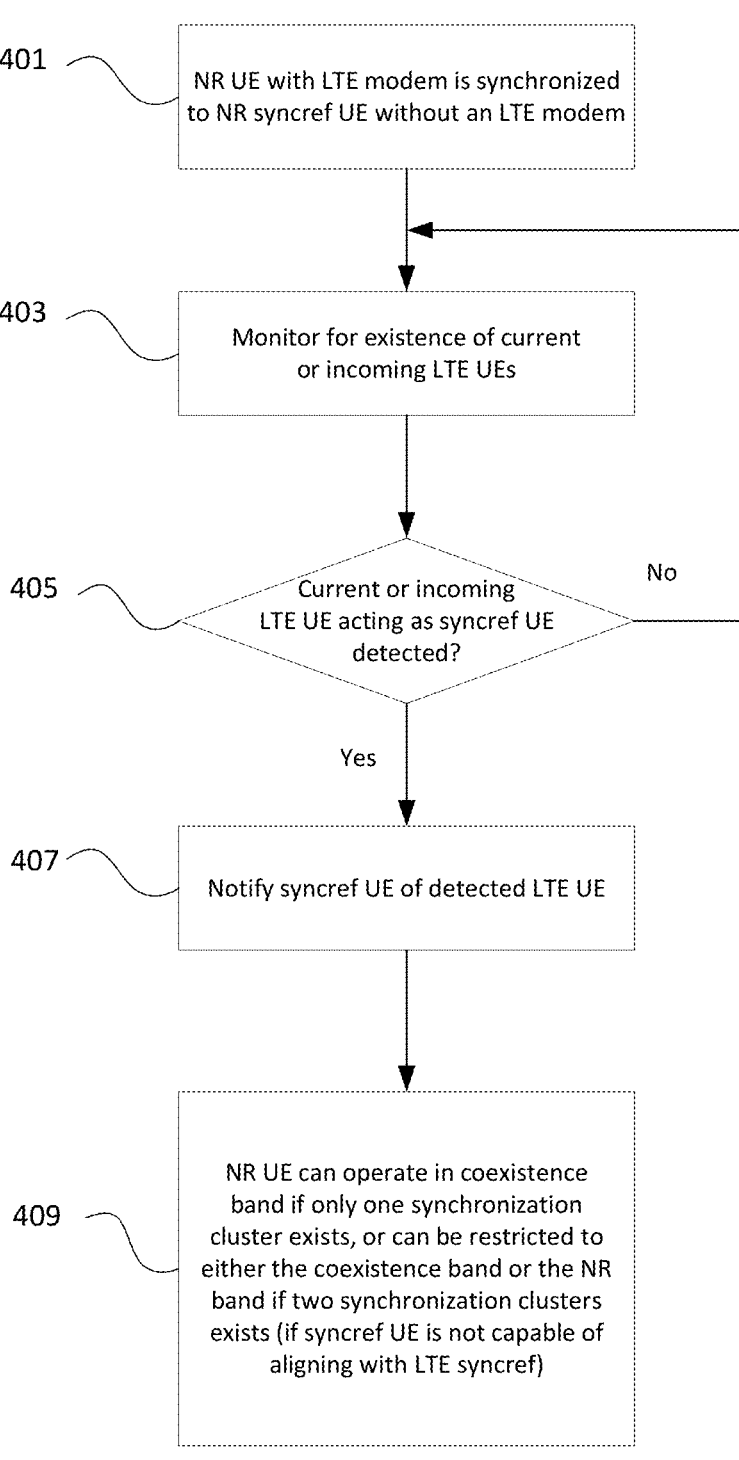
FIG. 4 is a flowchart illustrating a procedure for NR UEs to detect incoming LTE UEs when operating in coexistence band, when an NR syncref UE does not have an LTE modem, according to an embodiment.

FIG. 4 is a flowchart illustrating a procedure for NR UEs to detect incoming LTE UEs when operating in coexistence band, when an NR syncref UE does not have an LTE modem, according to an embodiment.

Referring to FIG. 4, in step 401, an NR UE with an LTE modem is synced to an NR syncref UE without an LTE modem.

In step 403, the NR UE monitors for current or incoming LTEs.

If a current or incoming LTE UE acting as a syncref UE is detected in step 405, then the NR UE notifies the NR syncref UE of the detected LTE UE acting as a syncref UE in step 407.

In step 409, the NR UE operates in a coexistence band if only one synchronization cluster exists, or is restricted to the coexistence band or the NR band, if two synchronization clusters exists (i.e., if syncref UE is not capable of aligning with LTE syncref).

Retransmission of Synchronization Signals

An NR UE with an LTE modem connected to a Level 4 synchronization source may retransmit an LTE syncref signal. This allows other neighboring NR UEs without LTE modems to align their synchronization and eventually have one synchronization cluster.

When transmitting the synchronization signal, an NR UE may also indicate that a source of the synchronization is an LTE syncref UE. For example, this indication can be carried in a PSBCH payload or by using a specific SL-PSS and SL-SSS sequence in the coexistence band (e.g., a specific SLSSID) or a combination thereof.

If an NR UE with an LTE modem is connected to an NR UE retransmitting an LTE reference signal (i.e., Level 5/6 synchronization source) the NR UE may measure its signal strength against a threshold (e.g., a retransmission threshold can be configured per resource pool). If the measured signal strength is below the threshold, the NR UE may retransmit the synchronization signal to other neighboring UEs so that they can also be synchronized to the same synchronization source. A different cutoff threshold than that for other levels can be used in this case to decide whether to retransmit the synchronization signal or not (e.g., a higher threshold). This may increase the likelihood that the LTE syncref synchronization signal has a greater coverage area.

If an NR UE has an LTE modem and is acting as a syncref UE, but cannot find an LTE syncref UE, then NR UE can send two synchronization signals. That is, the NR UE may send a first synchronization signal with its LTE modem and a second synchronization signal with its NR modem so that incoming LTE UEs entering the system can synchronize to this UE, thus creating one synchronization cluster in the coexistence band.

Figure 5:
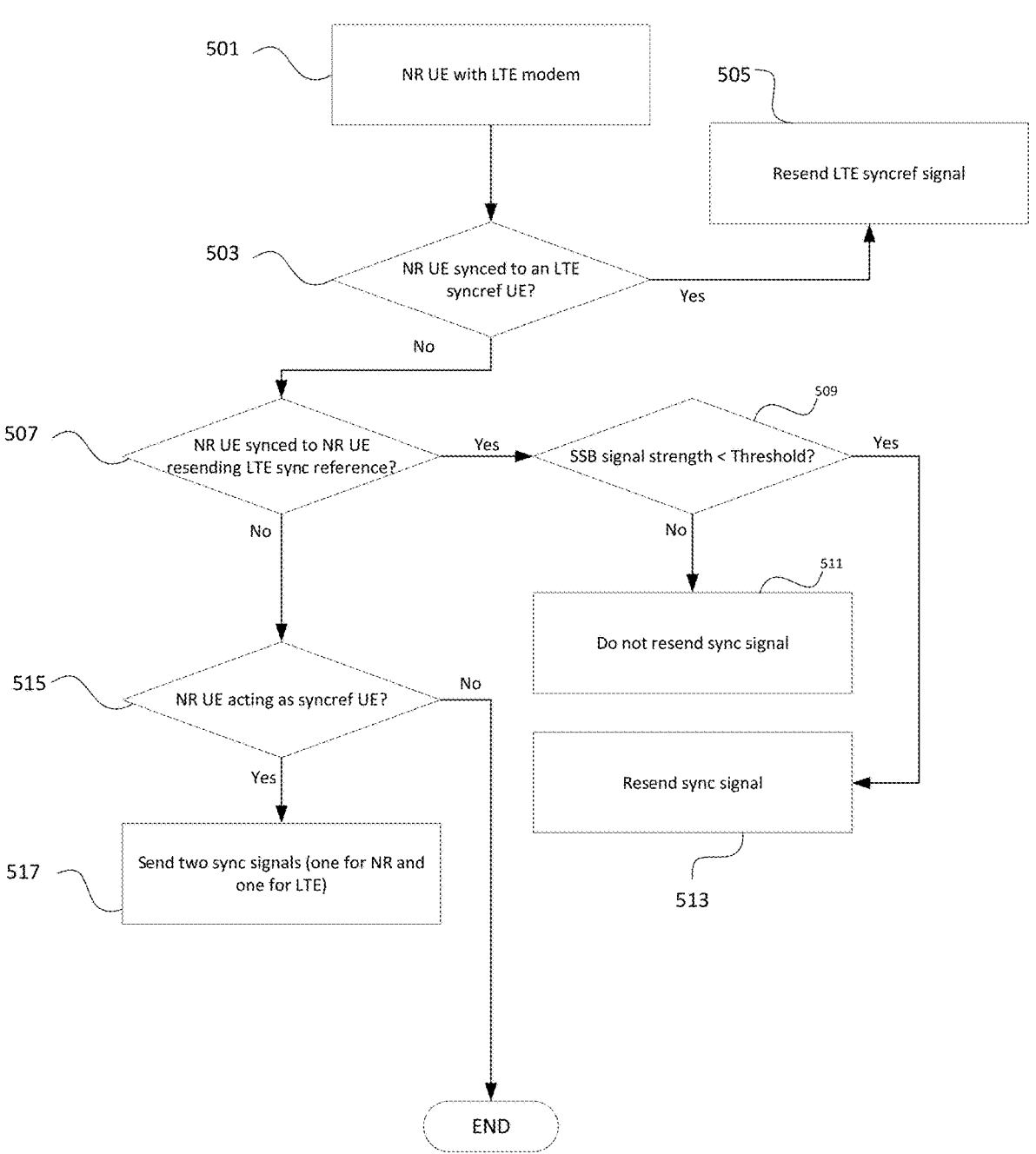
FIG. 5 is a flowchart illustrating a procedure for an NR UE with an LTE modem to retransmit an SSB signal, when operating in a coexistence band, according to an embodiment.

FIG. 5 is a flowchart illustrating a procedure for an NR UE with an LTE modem to retransmit an SSB signal, when operating in a coexistence band, according to an embodiment.

Referring to FIG. 5, in step 501, the NR UE is operating with an LTE modem.

In step 503, the NR UE determines if it is synced to an LTE syncref UE. If the NR UE is synced to an LTE syncref UE in step 503, the NR UE resends an LTE syncref signal in step 505.

However, if the NR UE is not synced to an LTE syncref UE in step 503, the NR UE determines if it is synced to an NR UE resending an LTE syncref signal in step 507. If the NR UE is synced to an NR UE resending an LTE syncref signal in step 507, the NR UE compares a measured SSB signal strength to a threshold in step 509.

If the measured SSB signal strength is less than the threshold in step 509, the NR UE resends the sync signal in step 513. However, if the measured SSB signal strength is not less than the threshold in step 509, the NR UE does not reseed the sync signal in step 511.

If the NR UE is not synced to an NR UE resending an LTE syncref signal in step 507, the NR UE determines if it is acting as a syncref UE in step 515.

If the NR UE is acting as a syncref UE in step 515, the NR UE sends two sync signal (i.e., one for NR and one for LTE) in step 517.

If the NR UE is not acting as a syncref UE in step 515, the procedure ends.

In accordance with an embodiment, an NR UE without an LTE modem may retransmit a synchronization signal if connected to a Levels 4/5 synchronization source with a different cutoff threshold than that for other levels (e.g., a higher threshold). This may increase the likelihood that an LTE syncref synchronization signal has greater coverage area.

As described above, when transmitting the synchronization signal, the NR UE may indicate that the source of the synchronization is an LTE syncref UE. For example, this indication may be carried in a PSBCH payload or by using a specific SL-PSS and SL-SSS sequence in the coexistence band or a combination thereof.

Figure 6:
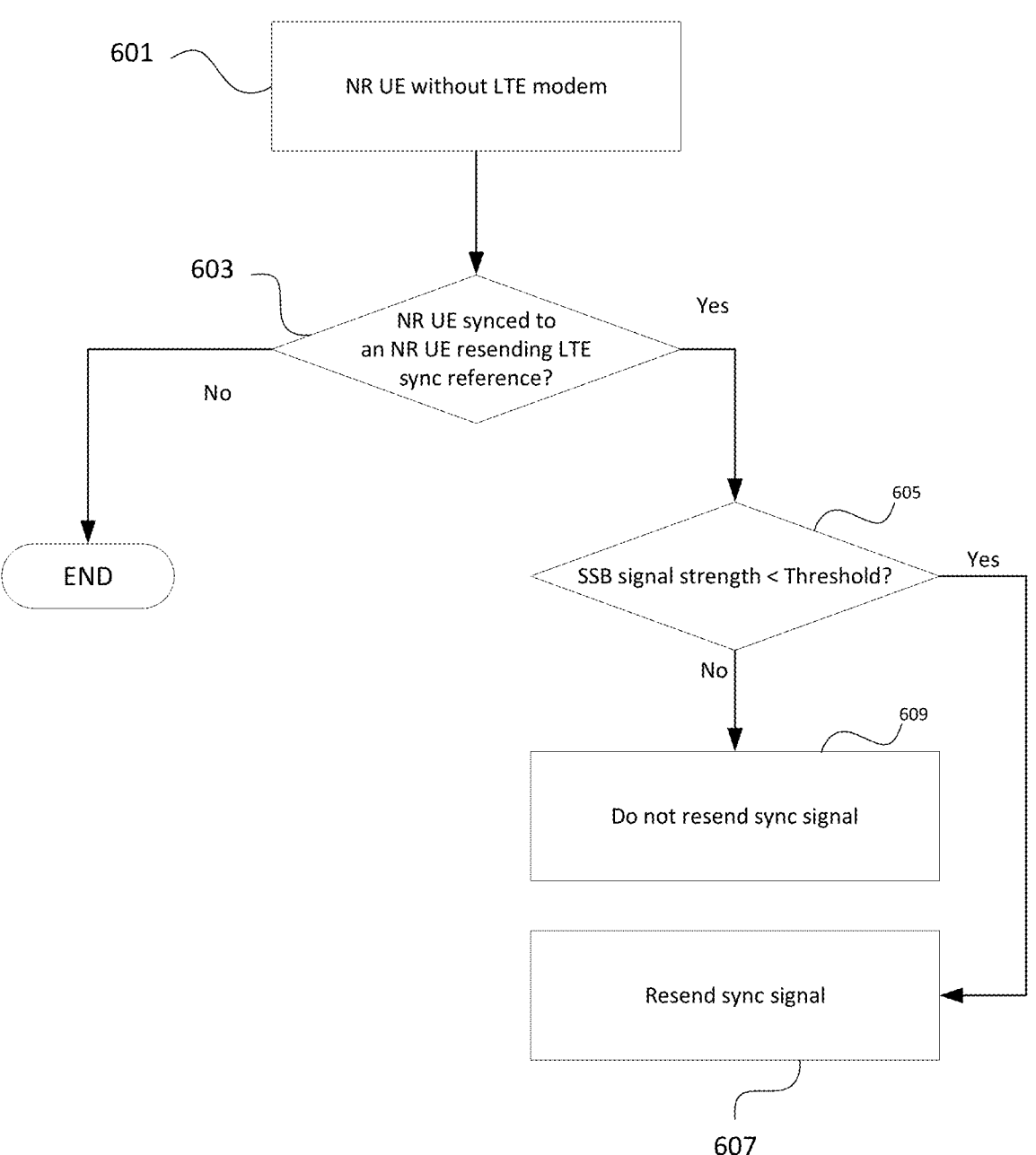
FIG. 6 is a flowchart illustrating a procedure for an NR UE without an LTE modem to retransmit an SSB signal, when operating in a coexistence band, according to an embodiment.

FIG. 6 is a flowchart illustrating a procedure for an NR UE without an LTE modem to retransmit an SSB signal, when operating in a coexistence band, according to an embodiment.

Referring to FIG. 6, in step 601, an NR UE operates without an LTE modem.

In step 603, the NR UE determines if it is synced to an NR UE resending LTE sync reference signals. If the NR UE is not synced to an NR UE resending LTE sync reference signals in step 603, the procedure ends.

However, if the NR UE is not synced to an NR UE resending LTE sync reference signals in step 603, the NR UE compares a measured SSB signal strength to a threshold in step 605.

If the measured SSB signal strength is less than the threshold in step 605, the NR UE resends the sync signal in step 607. However, if the measured SSB signal strength is not less than the threshold in step 605, the NR UE does not resend the sync signal in step 607.

In accordance with the above-described embodiments, when operating in a coexistence band, one synchronization cluster is provided that covers both LTE UEs and NR UEs operating in the coexistence and NR bands.

In accordance with the above-described embodiments, an NR UE may prioritize an LTE synchronization order when operating a coexistence band.

In accordance with the above-described embodiments, an NR UE operating in a coexistence band with an LTE modem may abide with a synchronization order as shown in Table 3, when selecting its synchronization source when a GNSS is configured as a synchronization source for LTE UEs.

In accordance with the above-described embodiments, an NR UE operating in a coexistence band with an LTE modem may abide with a synchronization order as shown in Table 4, when selecting its synchronization source when an eNB is configured as a synchronization source for LTE UEs.

In accordance with the above-described embodiments, an NR UE with an LTE modem connected to a Level 4 synchronization source may retransmit an LTE syncref signal, thereby allowing neighboring NR UEs without LTE modems to align their synchronization and eventually have one synchronization cluster. This may be done irrespective of a received signal strength.

In accordance with the above-described embodiments, an NR UE synchronized to an NR syncref UE retransmitting an LTE sync-ref signal may attempt to retransmit a synchronization SSB if a received signal strength is below a threshold. The threshold for retransmitting the synchronization SSB can be pre-configured specifically for a resource pool within a coexistence band and can be set separately from other thresholds for retransmitting SSB for the NR band (e.g., the threshold can be set to a higher value for the coexistence band in order to increase the chances of having a single synchronization cluster).

In accordance with the above-described embodiments, an NR UE, which is synchronized to an NR syncref UE without an LTE modem, may notify the NR syncref UE of the presence of LTE UEs in order to align synchronization clusters.

In accordance with the above-described embodiments, an NR UE without an LTE modem may be restricted from using a coexistence resource pool, e.g., based on priority or a measured channel busy ratio (CBR).

In accordance with the above-described embodiments, an NR UE without an LTE modem may be restricted from using a coexistence band, if not synchronized to an eNB/gNB (when eNBs and gNBs are synchronized) or when synchronized to an NR syncref UE without an LTE modem.

In accordance with the above-described embodiments, an NR UE without an LTE modem operating in a coexistence band may abide with a synchronization order as shown in Table 5 when selecting its synchronization source when a GNSS is configured as a synchronization source for LTE UEs.

In accordance with the above-described embodiments, an NR UE without an LTE modem operating in a coexistence band may abide with a synchronization order as shown in Table 6 when selecting its synchronization source when an eNB is configured as a synchronization source for LTE UEs.

In accordance with the above-described embodiments, NR UEs without LTE modems, which are synchronized to a Level 9 source, may operate in a coexistence band if their synchronization source has an LTE modem. This can be indicated as part of a PSBCH, by using reserved SL-PSS/SL-SSS sequences, by UE capability exchange, or by RRC configuration.

In accordance with the above-described embodiments, NR UEs without LTE modems and acting as syncref UEs may indicate that they are not equipped with an LTE modem. If an indication is received from a neighboring UE of the presence of an LTE UE acting as a syncref UE, then the NR UE can refrain from acting as a syncref UE in order to avoid multiple synchronization clusters.

gNBs/eNBs not Synchronized (gNBs Synchronized to a GNSS)

Here, it is assumed that a gNB and an eNB are not synchronized. That is, if NR UEs are synchronized to gNBs and LTE UEs are synchronized to eNBs, then there will be two synchronization clusters. It is also assumed that a GNSS is synchronized only to the gNBs. Further, it is assumed that an NR UE that wants to operate in a coexistence band has an LTE modem. If the NR UE wants to operate in the coexistence band, then it will abide with a synchronization order as shown in Table 7 below, when a GNSS is configured as a synchronization source for LTE UEs. The synchronization order in Table 7 ensures the existence of one synchronization cluster.

TABLE 7

| Order | Synchronization source |
| --- | --- |
| Level 1 | GNSS |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | LTE Syncref UE |
| Level 5 | A Syncref UE directly synchronized |

TABLE 7-continued

| Order | Synchronization source |
| --- | --- |
| (optional) | to a Level 4 source. |
| Level 6 | A Syncref UE synchronized to |
| (Optional) | a Level 5 source, i.e., indirectly synchronized to a Level 4 source. |
| Level 7 | gNB |
| Level 8 | A Syncref UE directly synchronized to a Level 7 source. |
| Level 9 | A Syncref UE synchronized to a Level 8 source, i.e., indirectly synchronized to a Level 7 source. |
| Level 10 | Any other Syncref UE. |
| Level 11 | UE's internal clock. |

However, when a GNSS is not configured as a synchronization source for LTE UEs, a synchronization order as shown in Table 8 below may be followed when operating in a coexistence band.

TABLE 8

| Order | Synchronization source |
| --- | --- |
| Level 1 | eNB |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | LTE Syncref UE |
| Level 5 | A Syncref UE directly synchronized |
| (optional) | to a Level 4 source. |
| Level 6 | A Syncref UE synchronized to |
| (Optional) | a Level 5 source, i.e., indirectly synchronized to a Level 4 source. |
| Level 7 | Whichever of GNSS or gNB based on configuration. |
| Level 8 | A Syncref UE directly synchronized to a Level 7 source. |
| Level 9 | A Syncref UE synchronized to a Level 8 source, i.e., indirectly synchronized to a Level 7 source. |
| Level 10 | Any other Syncref UE. |
| Level 11 | UE's internal clock. |

Alternatively, a synchronization order as shown in Table 9 below may be followed for an NR UE to explore all possible synchronization sources for NR, when a GNSS is not configured as a synchronization source for LTE UEs.

TABLE 9

| Order | Synchronization source |
| --- | --- |
| Level 1 | eNB |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | LTE Syncref UE |
| Level 5 | A Syncref UE directly synchronized |
| (optional) | to a Level 4 source. |
| Level 6 | A Syncref UE synchronized to |
| (Optional) | a Level 5 source, i.e., indirectly synchronized to a Level 4 source. |
| Level 7 | Whichever of GNSS or gNB based on configuration. |
| Level 8 | A Syncref UE directly synchronized to a Level 7 source. |
| Level 9 | A Syncref UE synchronized to a Level 8 source, i.e. indirectly synchronized to a Level 7 source. |
| Level 10 | GNSS or gNB whichever was not |
| (Optional) | configured in Level 7. |

TABLE 9-continued

| Order | Synchronization source |
|---|---|
| Level 11 (Optional) | A Syncref UE directly synchronized to a Level 10 source. |
| Level 12 (Optional) | A Syncref UE synchronized to a Level 11 source, i.e. indirectly synchronized to a Level 10 source. |
| Level 13 | Any other Syncref UE. |
| Level 14 | UE's internal clock. |

However, when an NR UE does not have an LTE modem, it can select a synchronization source according to an order as shown in Table 10 below, when a GNSS is configured as a synchronization source for LTE UEs.

TABLE 10

| Level 1 | GNSS |
|---|---|
| Level 2 | A Syncref UE directly synchronized to a Level 1 source. |
| Level 3 | A Syncref UE synchronized to a Level 2 source, i.e., indirectly synchronized to a Level 1 source. |
| Level 4 | A Syncref UE directly synchronized to an LTE syncref UE. |
| Level 5 (Optional) | A Syncref UE synchronized to a Level 4 source, i.e., indirectly synchronized to an LTE syncref UE. |
| Level 6 | gNB |
| Level 7 | A Syncref UE directly synchronized to a Level 6 source. |
| Level 8 | A Syncref UE synchronized to a Level 7 source, i.e., indirectly synchronized to a Level 6 source. |
| Level 9 | Any other Syncref UE |
| Level 10 | UE's internal clock. |

Similarly, when a GNSS is not configured as a synchronization source for LTE UEs and when an NR UE does not have an LTE modem, a synchronization order as shown in Table 11 below can be followed.

TABLE 11

| Order | Synchronization source |
|---|---|
| Level 1 | eNB. |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | A Syncref UE directly synchronized to an LTE syncref UE. |
| Level 5 (Optional) | A Syncref UE synchronized to a Level 4 source, i.e., indirectly synchronized to an LTE syncref UE. |
| Level 6 | GNSS or gNB based on configuration. |
| Level 7 | A Syncref UE directly synchronized to a Level 6 source. |
| Level 8 | A Syncref UE synchronized to a Level 7 source, i.e., indirectly synchronized to a Level 6 source. |
| Level 9 | Any other Syncref UE |
| Level 10 | UE's internal clock. |

Alternatively, a synchronization order as shown in Table 12 below can be followed be followed to select a synchronization source in a coexistence band, when a GNSS is not configured as a synchronization source.

TABLE 12

| Order | Synchronization source |
|---|---|
| Level 1 | eNB. |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | A Syncref UE directly synchronized to an LTE syncref UE. |
| Level 5 (Optional) | A Syncref UE synchronized to a Level 4 source, i.e., indirectly synchronized to an LTE syncref UE. |
| Level 6 | GNSS or gNB based on configuration. |
| Level 7 | A Syncref UE directly synchronized to a Level 6 source. |
| Level 8 | A Syncref UE synchronized to a Level 7 source, i.e., indirectly synchronized to a Level 6 source. |
| Level 9 (Optional) | GNSS or gNB (whichever was not configured in Level 6) |
| Level 10 (Optional) | A Syncref UE directly synchronized to a Level 9 source. |
| Level 11 (Optional) | A Syncref UE synchronized to a Level 10 source, i.e., indirectly synchronized to a Level 9 source. |
| Level 12 | Any other Syncref UE |
| Level 13 | UE's internal clock. |

Additionally, the following limitations may be applied for NR UEs without LTE modems.

NR UEs without LTE modems may operate in a coexistence band if their synchronization source level is below Level 6. For example, this can be done by resource pool configuration.

NR UEs without LTE modems that are synchronized to a syncref UE may operate in s coexistence band, if their synchronization source has an LTE modem. This can be indicated as part of a PSBCH, by using reserved SL-PSS/SL-SSS sequences, by UE capability exchange, or by RRC configuration.

Figure 7A:
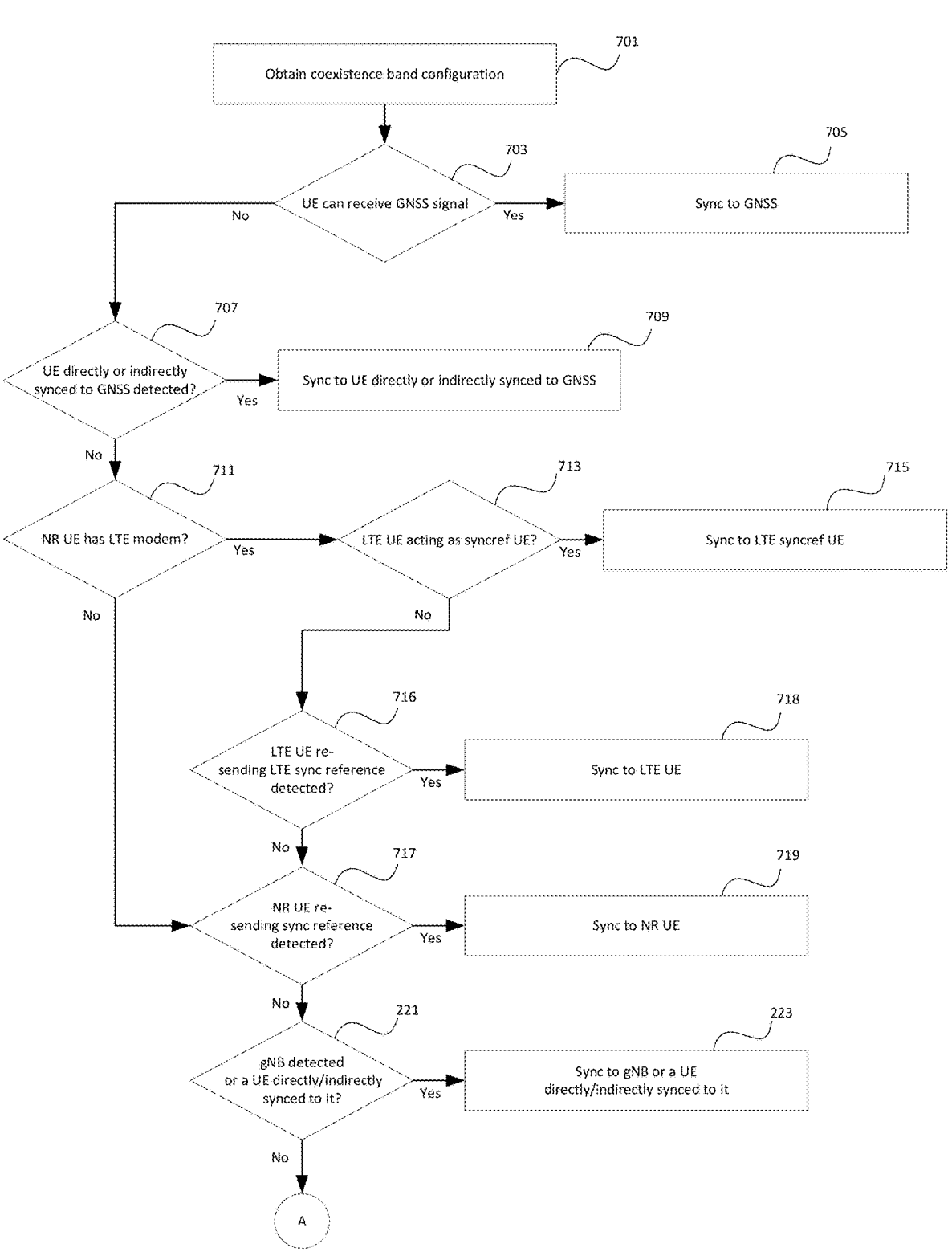
FIGS. 7A and 7B are a flowchart illustrating a synchronization order for an NR UE operating in a coexistence band, when a GNSS is configured as a synchronization source for LTE UEs, according to an embodiment.
Figure 7B:
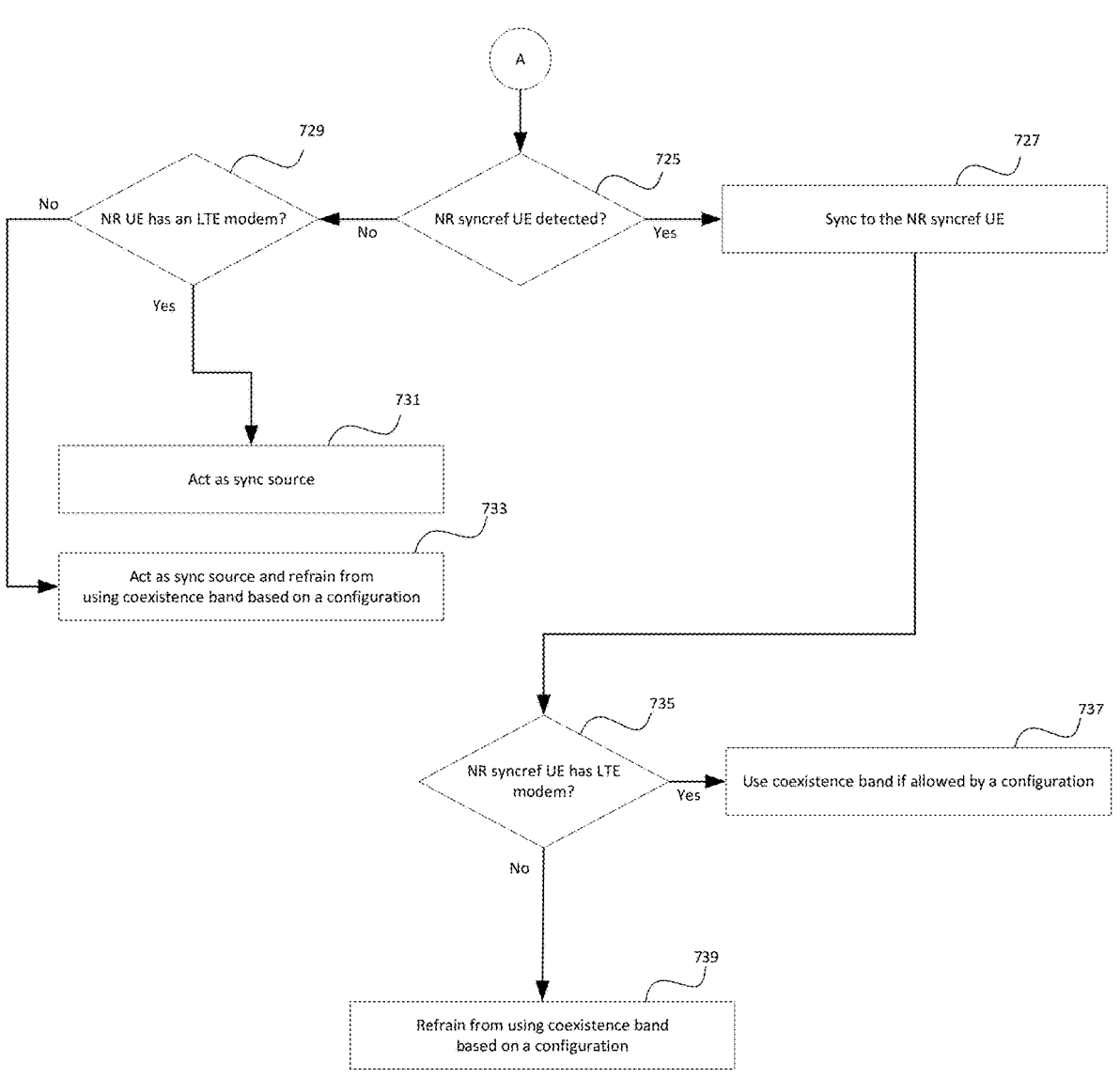

FIGS. 7A and 7B are a flowchart illustrating a synchronization order for an NR UE operating in a coexistence band, when a GNSS is configured as a synchronization source for LTE UEs, according to an embodiment. For example, the synchronization procedure illustrated in FIGS. 7A and 7B may follow Tables 7 and 10 above.

Referring to FIG. 7A, in step 701, the NR UE obtains a coexistence band configuration.

In step 703, the NR UE determines whether it can receive a GNSS signal.

If a GNSS can be received in step 703, then the NR UE syncs to the GNSS in step 705. However, if a GNSS cannot be received in step 703, then the NR UE determines whether a UE, which is directly or indirectly synced to the GNSS, is detected in step 707.

When the NR UE detects a UE, which is directly or indirectly synced to the GNSS, in step 707, the NR UE syncs to the detected UE in step 709.

When the NR UE does not detect a UE, which is directly or indirectly synced to the GNSS, in step 707, the NR UE determines whether it has an LTE modem in step 711.

When the NR UE determines has an LTE modem in step 711, the NR UE determines whether an LTE UE acting as a syncref UE can be detected via the LTE modem in step 713. When the NR UE detects an LTE UE acting as a syncref UE in step 713, the NR UE syncs to the LTE syncref UE in step 715.

However, when the NR UE does not detect an LTE UE acting as a syncref UE in step 713, the NR UE determines whether an LTE UE that is resending an LTE sync reference signal can be detected in step 716. When the NR UE detects an LTE UE that is resending an LTE sync reference signal in step 716, the NR UE syncs to the LTE UE in step 218.

However, when the NR UE does not have an LTE modem in step 711 or when the NR UE does not detect an LTE UE that is resending an LTE sync reference signal in step 716, the NR UE determines whether an NR UE that is resending a sync reference signal based on an LTE sync reference signal can be detected in step 717.

When the NR UE detects an NR UE that is resending the sync reference signal in step 717, the NR UE syncs to the NR UE that is resending the sync reference signal in step 719. However, when the NR UE does not detect an NR UE that is resending a sync reference signal in step 717, the NR UE determines whether a gNB or a UE, which is directly or indirectly synced to the gNB, can be detected in step 721.

If a gNB or a UE, which is directly or indirectly synced to the gNB, can be detected in step 721, then the NR UE syncs to the detected gNB or UE in step 723.

Referring to FIG. 7B, if neither a gNB nor a UE, which is directly or indirectly synced to the gNB, can be detected in step 721, then the NR UE determines whether an NR syncref UE is detected in step 725.

When an NR syncref UE is detected in step 725, the NR UE syncs to the NR syncref UE in step 727.

However, when an NR syncref UE is not detected in step 725, the NR UE determines if it has an LTE modem in step 729. If the NR UE does not have an LTE modem in step 729, the NR UE will act as a sync source and refrain from using the coexistence band based on a configuration in step 733. If the NR UE has an LTE modem in step 729, the NR UE will act as a sync source and may use the coexistence band in step 731.

In step 735, after syncing to the NR syncref UE in step 727, the NR UE determines if the NR syncref UE has an LTE modem.

If the NR UE determines that the NR syncref UE has an LTE modem in step 735, the NR UE may use the coexistence band in step 737, if allowed by configuration.

However, if the NR UE determines that the NR syncref UE does not have an LTE modem in step 735, the NR UE will refrain from using the coexistence band based on a configuration in step 739.

Figure 8A:
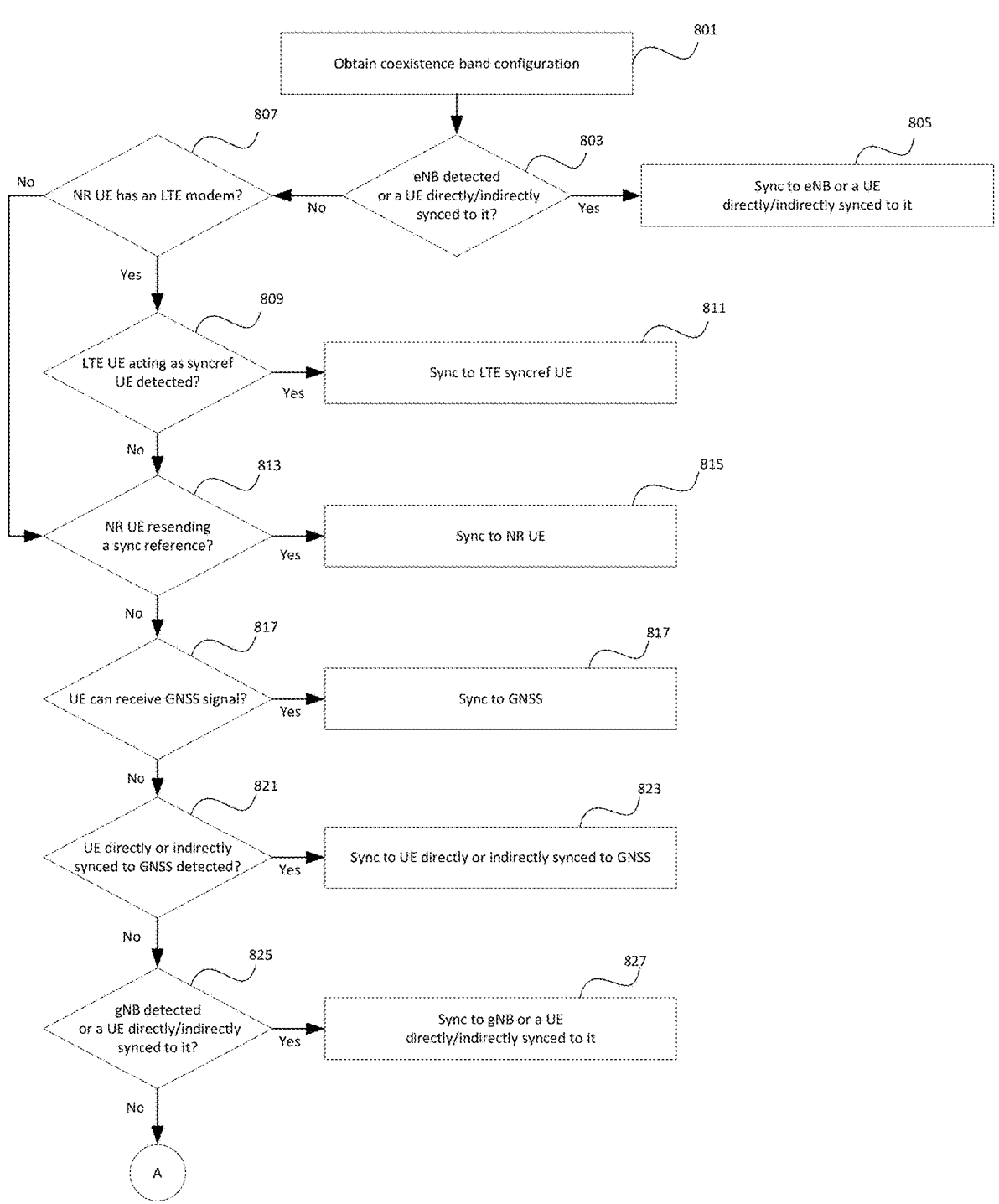
FIGS. 8A and 8B are a flowchart illustrating a synchronization order for an NR UE operating in a coexistence band, when a GNSS is not configured as a synchronization source for LTE UEs, according to an embodiment.
Figure 8B:
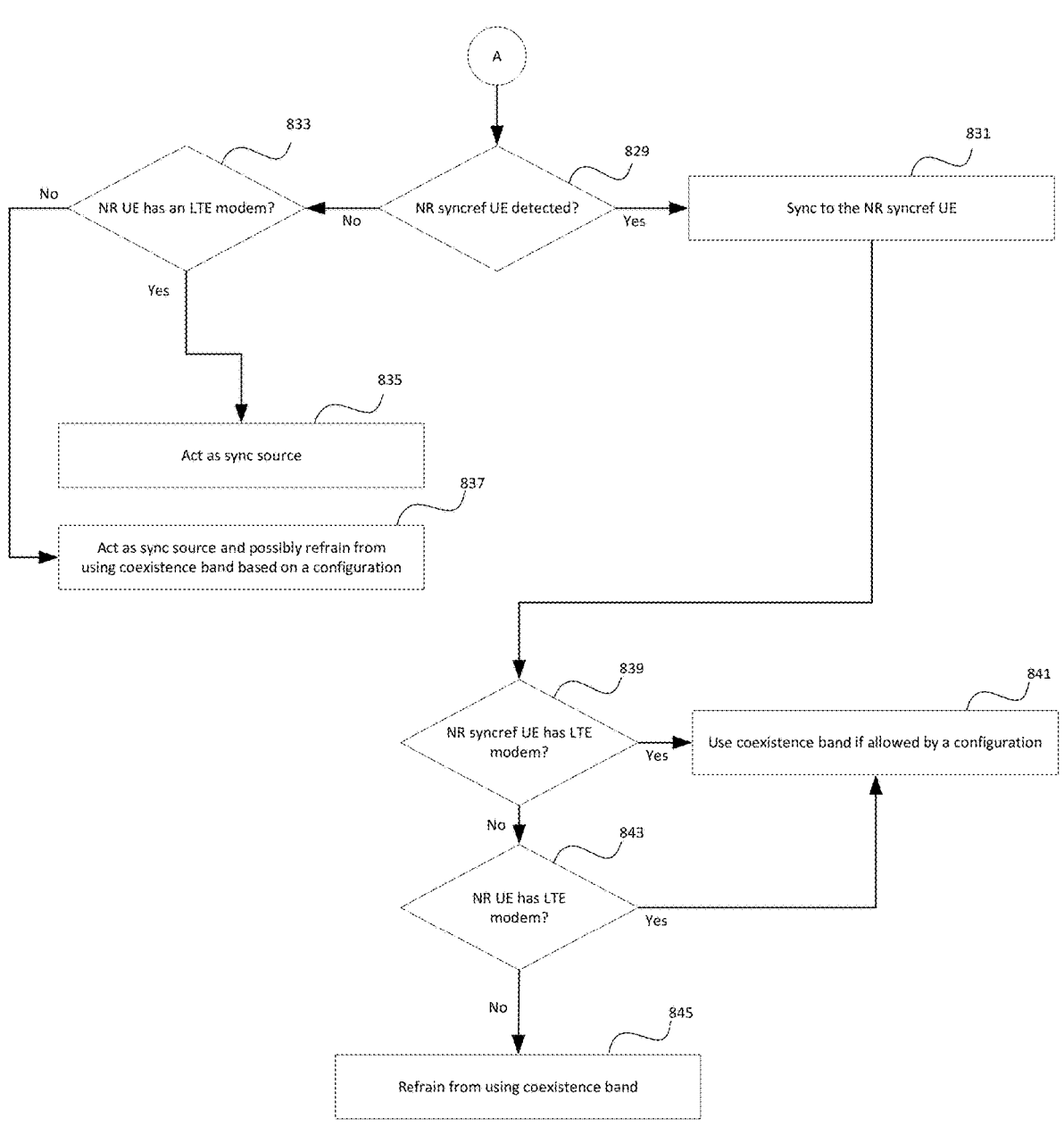

FIGS. 8A and 8B are a flowchart illustrating a synchronization order for an NR UE operating in a coexistence band, when a GNSS is not configured as a synchronization source for LTE UEs, according to an embodiment. For example, the synchronization procedure illustrated in FIGS. 8A and 8B may follow Table 12 above.

Referring to FIG. 8A, in step 801, the NR UE obtains a coexistence band configuration.

In step 803, the NR UE determines whether an eNB or a UE, which is directly or indirectly synced to the eNB, is detected.

If an eNB or a UE, which is directly or indirectly synced to the eNB, is detected in step 803, then the NR UE syncs to the detected eNB or UE in step 705. However, if neither an eNB nor a UE, which is directly or indirectly synced to the eNB, is detected in step 803, then the NR UE determines whether it has an LTE modem in step 807.

When the NR UE has an LTE modem in step 807, the NR UE determines whether an LTE UE acting as a syncref UE can be detected via the LTE modem in step 809. When the NR UE detects an LTE UE acting as a syncref UE in step 809, the NR UE syncs to the LTE UE in step 811.

However, when the NR UE does not have an LTE modem in step 807 or when the NR UE does not detect an LTE UE acting as a syncref UE in step 809, the NR UE determines whether an NR UE that is resending a sync reference signal can be detected in step 813.

When the NR UE detects an NR UE that is resending a sync reference signal in step 813, the NR UE syncs to the NR UE that is resending the sync reference signal in step 815. However, when the NR UE does not detect an NR UE that is resending an LTE sync reference signal in step 813, the NR UE determines whether it can receive a GNSS signal in step 817.

When the NR UE determines that it can receive a GNSS signal in step 817, the NR UE syncs to the GNSS in step 819. However, when the NR UE determines that it cannot receive a GNSS signal in step 817, the NR UE determines whether a UE, which is directly or indirectly synced to the GNSS, is detected in step 821.

When a UE, which is directly or indirectly synced to the GNSS, is detected in step 821, the NR UE syncs to the detected UE in step 823.

However, when a UE, which is directly or indirectly synced to the GNSS, is not detected in step 821, the NR UE determines whether a gNB or a UE, which is directly or indirectly synced to the gNB, can be detected in step 825.

If a gNB or a UE, which is directly or indirectly synced to the gNB, is detected in step 825, then the NR UE syncs to the detected gNB or UE in step 827.

Referring to FIG. 8B, if neither a gNB nor a UE, which is directly or indirectly synced to the gNB, is detected in step 825, then the NR UE determines whether an NR syncref UE is detected in step 829.

When an NR syncref UE is detected in step 829, the NR UE syncs to the NR syncref UE in step 831. However, when an NR syncref UE is not detected in step 829, the NR UE determines if it has an LTE modem in step 833.

If the NR UE does not have an LTE modem in step 833, the NR UE will act as a sync source and, based on a configuration, may refrain from using the coexistence band in step 837. For example, only high priority UEs may be allowed to use the coexistence band.

However, if the NR UE has an LTE modem in step 833, the NR UE will act as a sync source and may use the coexistence band in step 835.

In step 839, after syncing to the NR syncref UE in step 831, the NR UE determines if the NR syncref UE has an LTE modem.

If the NR UE determines that the NR syncref UE has an LTE modem in step 839, the NR UE may use the coexistence band in step 841, if allowed by configuration.

However, if the NR UE determines that the NR syncref UE does not have an LTE modem in step 839, the NR UE determines if it has an LTE modem in step 843. If the NR UE does not have an LTE modem in step 843, the NR UE will refrain from using the coexistence band in step 845. If the NR UE has an LTE modem in step 843, the NR UE may use the coexistence band in step 841, if allowed by a configuration.

It is noted that the signaling aspects for retransmission of SSB signals and conditions for using a coexistence band can follow the same rules discussed above with reference to FIGS. 1A, 1B, 2A, 2B, and 3-7.

In accordance with the above-described embodiments, an NR UE operating in a coexistence band with an LTE modem may abide with a synchronization order as shown in Table 7 when selecting its synchronization source when a GNSS is configured as a synchronization source for LTE UEs (i.e., when gNBs and eNBs are not synchronized).

In accordance with the above-described embodiments, an NR UE with an LTE modem operating in a coexistence band may follow a complete NR synchronization source selection order if an eNB or an LTE syncref UE is not found, or may follow a reduced NR synchronization source selection order if an eNB or an LTE syncref UE is not found (i.e., either attempt to synchronized to a gNB or GNSS based on configuration, but not both).

In accordance with the above-described embodiments, an NR UE with an LTE modem operating in a coexistence band may abide with synchronization orders as shown in Tables 8 and 9 when selecting its synchronization source when an eNB is configured as a synchronization source for LTE UEs (i.e., when gNBs and eNBs are not synchronized).

In accordance with the above-described embodiments, an NR UE operating in a coexistence band without an LTE modem may abide with a synchronization order as shown in Table 10 when selecting its synchronization source when a GNSS is configured as a synchronization source for LTE UEs (i.e., when gNBs and eNBs are not synchronized).

In accordance with the above-described embodiments, an NR UE without an LTE modem operating in a coexistence band may follow a complete NR synchronization source selection order if an eNB or an NR UE retransmitting LTE syncref UE was not found, or may follow a reduced NR synchronization source selection order if an eNB or an NR UE retransmitting LTE syncref UE was not found (i.e., either attempt to synchronize to a gNB or GNSS based on configuration but not both).

gNB/eNB not Synchronized (eNBs Synchronized to a GNSS)

In this case, an order for selecting synchronization sources is similar to that described above for gNBs/eNBs that are not synchronized (where gNBs are synchronized to a GNSS). In particular, an order as shown in Table 13 can be followed when a GNSS is configured as a synchronization source for LTE UEs.

TABLE 13

| Order | Synchronization source |
| --- | --- |
| Level 1 | GNSS |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | LTE Syncref UE |
| Level 5 (Optional) | A Syncref UE directly synchronized to a Level 4 source. |
| Level 6 (Optional) | A Syncref UE synchronized to a Level 5 source, i.e., indirectly synchronized to a Level 4 source. |
| Level 7 | gNB |
| Level 8 | A Syncref UE directly synchronized to a Level 7 source. |
| Level 9 | A Syncref UE synchronized to a Level 8 source, i.e., indirectly synchronized to a Level 7 source. |
| Level 10 | Any other Syncref UE. |
| Level 11 | UE's internal clock. |

Alternatively, an order as shown in Table 14 may be followed for an NR UE to explore all possible synchronization sources for NR when a GNSS is not configured as a synchronization source for LTE UEs.

TABLE 14

| Order | Synchronization source |
| --- | --- |
| Level 1 | eNB |
| Level 2 | A Syncref UE directly synchronized to a Level 1 source. |
| Level 3 | A Syncref UE synchronized to a Level 2 source, i.e. indirectly synchronized to a Level 1 source. |
| Level 4 | LTE Syncref UE |
| Level 5 (Optional) | A Syncref UE directly synchronized to a Level 4 source. |
| Level 6 (Optional) | A Syncref UE synchronized to a Level 5 source, i.e., indirectly synchronized to a Level 4 source. |
| Level 7 | Whichever of GNSS or gNB based on configuration. |
| Level 8 | A Syncref UE directly synchronized to a Level 7 source. |
| Level 9 | A Syncref UE synchronized to a Level 8 source, i.e., indirectly synchronized to a Level 7 source. |
| Level 10 (Optional) | GNSS or gNB that was not configured in Level 7. |
| Level 11 (Optional) | A Syncref UE directly synchronized to a Level 10 source. |
| Level 12 (Optional) | A Syncref UE synchronized to a Level 11 source, i.e., indirectly synchronized to a Level 10 source. |
| Level 13 | Any other Syncref UE. |
| Level 14 | UE's internal clock. |

However, if an NR UE does not have an LTE modem, an order as shown in Table 15 can be followed when a GNSS is configured as a synchronization source for LTE UEs.

TABLE 15

| Order | Synchronization source |
| --- | --- |
| Level 1 | GNSS |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | A Syncref UE directly synchronized to an LTE syncref UE. |
| Level 5 (Optional) | A Syncref UE synchronized to a Level 5 source, i.e., indirectly synchronized to a Level 4 source. |
| Level 6 | gNB |
| Level 7 | A Syncref UE directly synchronized to a Level 6 source. |
| Level 8 | A Syncref UE synchronized to a Level 7 source, i.e., indirectly synchronized to a Level 6 source. |
| Level 9 | Any other Syncref UE |
| Level 10 | UE's internal clock. |

Similar to the cases described above, an order for synchronization sources as shown in Table 16 can be followed when a GNSS is not configured as a synchronization source for LTE UEs.

TABLE 16

| Order | Synchronization source |
| --- | --- |
| Level 1 | eNB. |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | A Syncref UE directly synchronized to an LTE syncref UE. |

TABLE 16-continued

| Order | Synchronization source |
|---|---|
| Level 5 (Optional) | A Syncref UE synchronized to a Level 5 source, i.e., indirectly synchronized to a Level 4 source. |
| Level 6 | GNSS or gNB based on configuration. |
| Level 7 | A Syncref UE directly synchronized to a Level 6 source. |
| Level 8 | A Syncref UE synchronized to a Level 7 source, i.e., indirectly synchronized to a Level 6 source. |
| Level 9 (Optional) | GNSS or gNB (whichever was not configured in Level 6) |
| Level 10 (Optional) | A Syncref UE directly synchronized to a Level 9 source. |
| Level 11 (Optional) | A Syncref UE synchronized to a Level 10 source, i.e., indirectly synchronized to a Level 9 source. |
| Level 12 | Any other Syncref UE |
| Level 13 | UE's internal clock. | gNB/eNB not Synchronized (GNSS Neither Synchronized to eNBs Nor gNBs)

In this section, it is assumed that gNBs and eNBs are not synchronized. That is, if NR UEs are synchronized to gNBs and LTE UEs are synchronized to eNBs, then there will be two synchronization clusters. It is also assumed that a GNSS is neither synchronized to the gNBs nor the eNBs. In addition, it is assumed that the NR UEs have LTE modems. Given these assumptions, the order for selecting the synchronization sources will be similar to that described above. In particular, an order as shown in Table 17 can be followed when a GNSS is configured as a synchronization source for LTE UEs.

TABLE 17

| Order | Synchronization source |
|---|---|
| Level 1 | GNSS |
| Level 2 | A Syncref UE directly synchronized to a Level 1 source. |
| Level 3 | A Syncref UE synchronized to a Level 2 source, i.e. indirectly synchronized to a Level 1 source. |
| Level 4 | LTE Syncref UE |
| Level 5 (Optional) | A Syncref UE directly synchronized to a Level 4 source. |
| Level 6 (Optional) | A Syncref UE synchronized to a Level 5 source, i.e., indirectly synchronized to a Level 4 source. |
| Level 7 | gNB |
| Level 8 | A Syncref UE directly synchronized to a Level 7 source. |
| Level 9 | A Syncref UE synchronized to a Level 8 source, i.e., indirectly synchronized to a Level 7 source. |
| Level 10 | Any other Syncref UE. |
| Level 11 | UE's internal clock. |

However, when a GNSS is not configured as a synchronization source for LTE UEs, a synchronization order as shown in Table 18 can be followed when operating in a coexistence band.

TABLE 18

| Order | Synchronization source |
|---|---|
| Level 1 | eNB |
| Level 2 | A Syncref UE directly synchronized to a Level 1 source. |

TABLE 18-continued

| Order | Synchronization source |
|---|---|
| Level 3 | A Syncref UE synchronized to a Level 2 source, i.e., indirectly synchronized to a Level 1 source. |
| Level 4 | LTE Syncref UE |
| Level 5 (Optional) | A Syncref UE directly synchronized to a Level 4 source. |
| Level 6 (Optional) | A Syncref UE synchronized to a Level 5 source, i.e., indirectly synchronized to a Level 4 source. |
| Level 7 | Whichever of GNSS or gNB based on configuration. |
| Level 8 | A Syncref UE directly synchronized to a Level 7 source. |
| Level 9 | A Syncref UE synchronized to a Level 8 source, i.e., indirectly synchronized to a Level 7 source. |
| Level 10 | Any other Syncref UE. |
| Level 11 | UE's internal clock. |

Alternatively, a procedure as shown in Table 19 can be followed for an NR UE to explore all possible synchronization sources for NR when a GNSS is not configured as a synchronization source for LTE UEs.

TABLE 19

| Order | Synchronization source |
|---|---|
| Level 1 | eNB |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | LTE Syncref UE |
| Level 5 (Optional) | A Syncref UE directly synchronized to a Level 4 source. |
| Level 6 (Optional) | A Syncref UE synchronized to a Level 5 source, i.e., indirectly synchronized to a Level 4 source. |
| Level 7 | Whichever of GNSS or gNB based on configuration. |
| Level 8 | A Syncref UE directly synchronized to a Level 7 source. |
| Level 9 | A Syncref UE synchronized to a Level 8 source, i.e., indirectly synchronized to a Level 7 source. |
| Level 10 (Optional) | GNSS or gNB that was not configured in Level 7. |
| Level 11 (Optional) | A Syncref UE directly synchronized to a Level 10 source. |
| Level 12 (Optional) | A Syncref UE synchronized to a Level 11 source, i.e., indirectly synchronized to a Level 10 source. |
| Level 13 | Any other Syncref UE. |
| Level 14 | UE's internal clock. |

Alternatively, if an NR UE does not have an LTE modem, an order as shown in Table 20 can be followed when a GNSS is configured as a synchronization source for LTE UEs.

TABLE 20

| Order | Synchronization source |
|---|---|
| Level 1 | GNSS |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | A Syncref UE directly synchronized to an LTE syncref UE. |

TABLE 20-continued

| Order | Synchronization source |
|-------|------------------------|
| Level 5 (Optional) | A Syncref UE synchronized to a Level 4 source, i.e., indirectly synchronized to an LTE syncref UE. |
| Level 6 | gNB |
| Level 7 | A. Syncref UE directly synchronized to a Level 6 source. |
| Level 8 | A Syncref UE synchronized to a Level 7 source, i.e., indirectly synchronized to a Level 6 source. |
| Level 9 | Any other Syncref UE |
| Level 10 | UE's internal clock. |

However, an order for synchronization sources as shown in Table 21 can be followed when a GNSS is not configured as a synchronization source for LTE UEs.

TABLE 21

| Order | Synchronization source |
|-------|------------------------|
| Level 1 | eNB. |
| Level 2 | A Syncref UE directly synchronized to a Level 1 source. |
| Level 3 | A Syncref UE synchronized to a Level 2 source, i.e., indirectly synchronized to a Level 1 source. |
| Level 4 | A Syncref UE directly synchronized to an LTE syncref UE. |
| Level 5 (Optional) | A Syncref UE synchronized to a Level 4 source, i.e., indirectly synchronized to an LTE syncref UE. |
| Level 6 | GNSS or gNB based on configuration. |
| Level 7 | A Syncref UE directly synchronized to a Level 6 source. |
| Level 8 | A. Syncref UE synchronized to a Level 7 source, i.e., indirectly synchronized to a Level 6 source. |
| Level 9 | Any other Syncref UE |
| Level 10 | UE's internal clock. |

Alternatively, an order as shown in Table 22 can be followed to select a synchronization source in a coexistence band when a GNSS is not configured as a synchronization source.

TABLE 22

| Order | Synchronization source |
|-------|------------------------|
| Level 1 | eNB. |
| Level 2 | A Syncref UE directly synchronized to a Level 1 source. |
| Level 3 | A Syncref UE synchronized to a Level 2 source, i.e. indirectly synchronized to a Level 1 source. |
| Level 4 | A Syncref UE directly synchronized to an LTE syncref UE. |
| Level 5 (Optional) | A Syncref UE synchronized to a Level 4 source, i.e., indirectly synchronized to an LTE syncref UE. |
| Level 6 | GNSS or gNB based on configuration. |
| Level 7 | A Syncref UE directly synchronized to a Level 6 source. |
| Level 8 | A Syncref UE synchronized to a Level 7 source, i.e., indirectly synchronized to a Level 6 source. |
| Level 9 (Optional) | GNSS or gNB (whichever was not configured in Level 6) |
| Level 10 (Optional) | A Syncref UE directly synchronized to a Level 9 source. |
| Level 11 (Optional) | A Syncref UE synchronized to a Level 10 source, i.e., indirectly synchronized to a Level 9 source. |

TABLE 22-continued

| Order | Synchronization source |
|-------|------------------------|
| Level 12 | Any other Syncref UE |
| Level 13 | UE's internal clock. |

Synchronization Alignment Between Coexistence Band and NR Band

After an NR UE synchronizes with an LTE syncref UE, the NR UE can also act as a syncref in the NR band and send SSBs to ensure that both systems (the NR and LTE systems) are synchronized. However, a problem may still exists in that two syncref UEs can coexist simultaneously. For example, a Rel-16 or Rel-17 UE can operate as a syncref for the NR band and another LTE V2X UE can operate as a syncref UE for the LTE/NR coexistence band. To address this type of problem, the following operations can be considered, wherein both the NR and LTE UEs are out of coverage (i.e., there is no GNSS or gNBs/eNBs).

In accordance with an embodiment of the disclosure, operation of NR UEs may be limited to one band only, if two synchronization sources exists. For example, a new NR UE that detects two syncref UEs can be limited to the NR band and synchronized to the NR syncref UE or can operate in a coexistence band and accordingly select an LTE V2X syncref UE. The synchronization to an LTE syncref UE can be done by an on-board LTE modem, if it exists, and the synchronization reference and parameters can be passed internally to the NR modem within the same UE. This decision may be based on a measured CBR and the NR UE can choose the least known occupied band when the CBR for NR and coexistence bands are available at the UE.

An NR UE can also be synchronized to two synchronization sources and operate in the two bands based on the source to which it is synchronized. For example, a Rel-18 NR UE can be synchronized to an LTE UE and accordingly operate in the coexistence band. At the same time, the NR UE can be synchronized to another NR UE and accordingly operating in the NR band. In this case, a UE may perform prioritization in case of overlapping transmissions/receptions in these two bands. For example, similar rules to LTE/NR coexistence prioritization can be applied.

Alternatively, a new field can be added in an SSB or a PSBCH in order to indicate an occupancy level of the NR band in order to allow the UE to perform the selection based on the measurements by the NR syncref UE. For example, the NR syncref UE can perform the CBR measurements and include the indication of high occupancy to upcoming UEs so that they can switch to the coexistence band if only one band is accessible.

A new field can also be added to an SSB or a PSBCH to indicate a retransmission of an LTE syncref signal and whether the NR UE is directly or indirectly connected to an LTE syncref signal. In addition, the indication of a retransmission of an LTE syncref signal can also be done by using reserved SL-PSS and SL-SSS sequences, similar to the approach used for the GNSS. In particular, a subset of SLSSIDs can be used to indicate that a UE is directly synchronized to an LTE syncref UE and another subset (e.g., by applying a shift of 336 on the SLSSID) to indicate that the UE is indirectly synchronized to an LTE syncref UE.

An NR UE may also send two syncref signals. In particular, the NR UE can reseed an LTE syncref signal received and a regular Rel-16/Rel-17 synchronization signal in order to ensure that there is only one synchronization cluster, in addition to being backward compatible and allowing Rel-16/Rel-17 UEs to operate without interruption.

An NR syncref UE can also be configured to continuously monitor for the presence of an LTE syncref UE when coexistence is enabled and accordingly stop acting as a syncref UE once an LTE syncref UE is detected.

NR UEs that detect two syncref UEs can also request an NR UE to stop acting as a syncref. In this case, the an NR UE can align to an LTE synchronized reference and retransmit SSBs in the NR band so that both bands are aligned.

Coexistence may be disabled if two syncref UEs are detected in the two bands in order to increase the likelihood that all NR messages can be received by all neighboring UEs, if they are not able to synchronize to the two synchronization sources, i.e., to avoid a scenario in which earlier releases of NR UEs cannot receive the NR messages since they can be synchronized to a different synchronization source.

Alternatively, an NR UE may transmit the same message twice depending on priority in order to increase likelihood that it will reach all NR UEs. Additionally, a message with a priority higher than a threshold can be restricted to the NR band in order to maintain backward compatibility and increase likelihood that these messages can be received by all neighboring UEs.

The above-described restrictions can be done based on resource pool configuration for the coexistence band.

In some cases, a resource pool can be configured for NR Rel-18 UEs over the NR band. This may be beneficial in the sense that such UEs can maintain the same synchronization cluster over this configured resource pool as well as the coexistence band. Since the resource pool can be configured exclusively for NR Rel-18 UEs, such UEs can follow an LTE synchronization order as described above to achieve one synchronization cluster that covers both the coexistence band as well as this resource pool. Subsequently, the UE will have access to all resources without having to sync to multiple synchronization references simultaneously.

In some cases, an NR Rel-18 UE may maintain two synchronization sources simultaneously (i.e., one for the NR band and another for the coexistence band), e.g., if there is an LTE syncref UE in the coexistence band, whereas the NR UEs are synchronized to the gNB in the NR band. In such a case, the Rel-18 NR UEs may be synchronized to the LTE syncref UE in order to operate in the coexistence band, but are not required to retransmit the synchronization signal in the NR band since there is a higher order synchronization source that may be used by earlier releases of NR UEs. This may help avoid creating two synchronization clusters in the NR band and ensure backward compatibility.

A restriction on retransmitting the LTE syncref signal may not apply to the coexistence band. That is, an NR UE that is synchronized to an LTE syncref UE may retransmit SSBs in the coexistence band. This SSB can be used by NR UEs without LTE modems when operating in the coexistence band, allowing for a single synchronization in the coexistence band. The transmission of the SSBs in the coexistence band can be done on resources periodically reserved by the on board LTE modem.

In case an NR UE is synchronized to an LTE synchronization source, some parameters may still be missing because an LTE PSBCH signal is different from that of NR. However, this may be resolved by relying on pre-configuration so that the NR UEs operate properly and obtain all needed parameters (e.g., a subcarrier spacing (SCS)).

In accordance with the above-described embodiments, an LTE UE may act as a syncref UE to NR UEs. In this case, the syncref selection procedure may be updated to add an additional step for LTE-based syncref UEs. The priority of an LTE syncref UE can be set higher to that of an NR UE and can be affected by whether coexistence is enabled or not in the resource pool.

In accordance with the above-described embodiments, using an LTE syncref UE by an NR UE may be limited only to a coexistence band and can be enabled/disabled per resource pool.

In accordance with the above-described embodiments, using an LTE syncref UE by an NR UE can be subject to UE capability (e.g., whether it has an LTE modem or not).

In accordance with the above-described embodiments, a problem of two syncref UEs simultaneously existing (i.e., an LTE syncref UE and an NR syncref UE) can be addressed by limiting the operation of NR devices to the NR band or the LTE coexistence band. The selection can be either based on a CBR or by an indication in a PSBCH by an NR syncref UE. Additionally, an NR syncref UE can monitor for upcoming LTE UEs that act as a syncref UE and accordingly stop acting as a syncref UE once an LTE syncref UE is found. Further, new incoming NR devices that detect the two syncref UEs can indicate to the NR UE the presence of the LTE syncref so that the two synchronization clusters can be merged. Coexistence can also be disabled for out of coverage UEs without GNSS synchronization In accordance with the above-described embodiments, when an NR UE synchronizes with an LTE syncref UE, remaining parameters (e.g., the SCS) may be obtained through pre-configuration.

In accordance with the above-described embodiments, a high priority periodic reservation by an LTE modem may allow an NR UE to send its synchronization signal in a coexistence band without interruption.

Selection of Resources for Transmitting Synchronization Signal

An NR UE may act as a syncref and send its synchronization signal in a coexistence band. This can be enabled/disabled by pre-configuration. In case it is enabled, it can also be limited only to NR UEs with on-board LTE modem so that a periodic reservation can be done in the coexistence band so that no interference occurs from the LTE devices (i.e., an SSB transmission interruption can occur if the resource is reserved by an LTE device).

Figure 9:
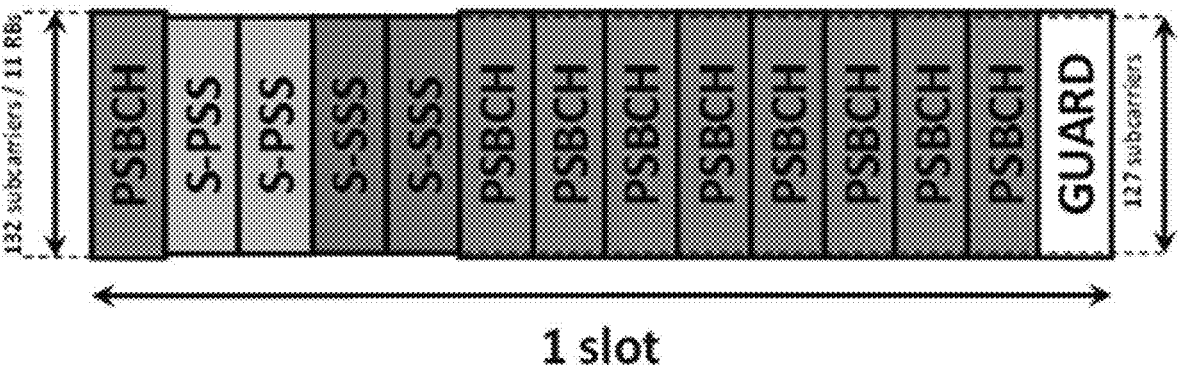
FIG. 9 illustrates a slot format for an SL SSB, according to an embodiment.

In particular, an NR UE may sends an internal request to an LTE modem to perform a periodic reservation in the LTE coexistence band. The selected subchannel size should be sufficient to carry the following NR synchronization signal (i.e., the equivalent of 11 NR physical resource blocks (PRBs)):

FIG. 9 illustrates a slot format for an SL SSB, according to an embodiment.

The periodicity signaled by the LTE modem is set equivalent to the required periodicity to send the SSB signal. In some cases, multiple periodic reservations may be necessary since the LTE possible periods does not cover 160 msec. Alternatively, a different period from the 160 msec can be used when transmitting SSBs in the coexistence band.

The duration reserved may be one LTE subframe (i.e., at least one slot).

The location in the frequency domain can be pre-configured per resource pool to reduce the complexity of blind detecting the SSB. That is, the LTE modem may be restricted to use a specific set of PRBs when performing its resource reservation.

When 1 LTE subframe is longer than one slot, the SSB can be repeated across consecutive slots to improve the reliability.

The priority of the reservation for SSB transmission can be set to the highest possible LTE priority in order to reduce the chances of collisions with neighboring UEs. This priority can also be pre-configured per resource pool.

A NR UE may abandon the transmission of SSB signals if a conflicting reservation is detected on one or more of upcoming resource reservations and indicated by the LTE modem subject to processing time requirement.

An NR UE may also be restricted from sending SSB signals in the coexistence band if the measured CBR is above a threshold (although the SSB should be sent in the NR band in this case).

Further, an NR UE can also retransmit an LTE reference signal in pre-configured resources for SSB transmission. For example, this can be done if the NR UE has an LTE modem.

In accordance with the above-described embodiments, an NR UE with an LTE modem can perform a periodic reservation in a coexistence band and use reserved resources for transmitting an SSB.

In accordance with the above-described embodiments, a location in a frequency domain to transmit SSBs can be pre-configured to reduce blind detection of the SSBs.

In accordance with the above-described embodiments, an SSB transmission may benefit from repetitions when an LTE subframe duration spans multiple slots.

In accordance with the above-described embodiments, a transmission of SSB signals in a coexistence band can be enabled/disabled by resource pool configuration.

In accordance with the above-described embodiments, a priority of an SSB transmission may be set to a highest LTE SL priority in order to reduce chances of collisions and resource reselection.

In accordance with the above-described embodiments, an SSB transmission by an NR UE in a coexistence band can be abandoned if its reserved future resource are indicated as conflicting by an LTE modem, subject to processing time requirements.

In addition to transmitting a synchronization signal in a coexistence band, an NR UE may transmit another SSB in an NR band. This may help with backward compatibility and increase the chances of having a single synchronization cluster across the two bands (i.e., the coexistence and the NR bands). In such a case, a UE may select different slots to transmit the SSB in the NR band than those used to send the SSB in the coexistence band in order to be able to transmit with full transmit power.

In accordance with the above-described embodiments, an NR UE may transmit SSBs in both the NR and the coexistence band, simultaneously, in order to maintain backward compatibility and increase the chances of having a single cluster.

In accordance with the above-described embodiments, a transmission of SSB signals in both bands may be done in non-overlapping slots to allow for full power transmission of SSBs.

To improve reliability of SSB transmissions within a coexistence band, a higher number of SSB transmissions may occur within a 160 msec periodicity of an SSB.

In particular, an NR UE may transmit two or more SSBs within 160 msec in order to reduce the chances of collisions with other LTE transmissions. The number of SSB transmissions per 160 msec can be pre-configured separately for a coexistence band and an NR band and can be pre-configured per resource pool.

In accordance with the above-described embodiments, multiple redundant SSB transmissions may occur in a coexistence band in order to improve reliability of the SSB transmissions since they are vulnerable to collisions with LTE transmissions. The number of redundant retransmissions can be configured per resource pool.

The content of an SSB transmitted in a coexistence band can be different from an SSB sent in an NR band. For example, specific SL-PSS and SL-SSS sequences can be sent in the coexistence band, which are different from those used in the NR band. The use of these sequences may indicate the source of the UE transmitting the SSB (e.g., a retransmission of an LTE syncref or a NR syncref UE).

In addition, a different PSBCH content can be used in the coexistence band with different master information block (MIB) contents that are matching with the coexistence band parameters. For example, a different SCS can be used in the coexistence band when compared to the NR band.

In accordance with the above-described embodiments, content of an SSB (e.g., an MIB) sent in a coexistence band can differ from that sent in an NR band.

PSBCH Contents in Case of Coexistence

In NR Rel-16, the contents of a PSBCH may include those shown in Table 23 below.

TABLE 23

| PSBCH contents | Number of bits | Notes |
|---|---|---|
| DFN | 10 | |
| Indication of TDD configuration | 12 | System-wide information, e.g. TDD-UL-DL common configuration and/or potential SL slots |
| Slot index | 7 | |
| In-coverage indicator | 1 | |
| Reserve bits | 2 | |
| CRC | 24 | |
| Total bits | 56 | |

In LTE V2X, the contents of the PSBCH may include those shown in Table 24 below.

TABLE 24

| PSBCH contents | Number of bits | Notes |
|---|---|---|
| DFN | 10 | |
| Direct subframe number | 4 | |
| SL-bandwidth | 3 | |
| In-coverage indicator | 1 | |
| Indication of TDD configuration | 3 | |
| Reserve bits | 27 | |
| Total bits | 56 | |

As shown Tables 23 and 24, the parameters from the NR Rel-16 PSBCH may be different from those obtained from the LTE-based PSBCH. The missing parameters can be pre-configured per resource pool or RRC configured.

Indication of TDD configuration: If a dedicated carrier is used for an SL, then all the slots can be considered as accessible by the SL and the TDD configuration can be configured as the one with all slots as uplink.

Slot index: The slot index can be always set to 0 with an assumption that SSBs are always sent in a first slot within an LTE subframe when they are transmitted in a coexistence band.

In accordance with the above-described embodiments, some NR parameters that are obtained through the Mai can be pre-configured per resource pool when they are operating in the coexistence band and following an LTE synchronization source. For example, the slot index can be always set to 0 with the assumption that the SSBs are always sent in the first slot within the LTE subframe.

Figure 10:
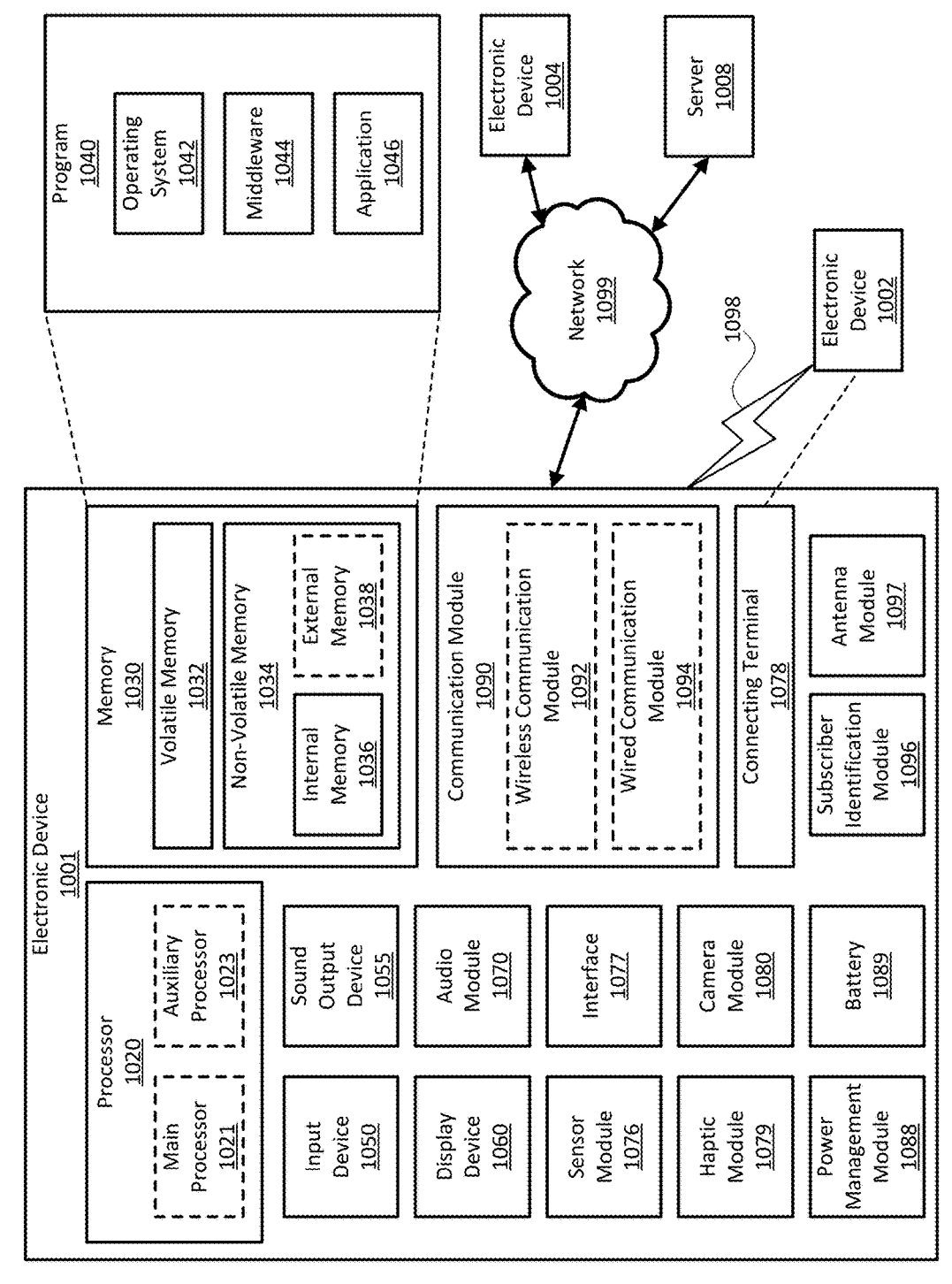
FIG. 10 is a block diagram of an electronic device in a network environment, according to an embodiment.

FIG. 10 is a block diagram of an electronic device in a network environment 1000, according to an embodiment.

Referring to FIG. 10, an electronic device 1001, e.g., an NR UE, in a network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1040, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) card 1096, or an antenna module 1094. In one embodiment, at least one (e.g., the display device 1060 or the camera module 1080) of the components may be omitted from the electronic device 1001, or one or more other components may be added to the electronic device 1001. Some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute software (e.g., a program 1040) to control at least one other component (e.g., a hardware or a software component) of the electronic device 1001 coupled with the processor 1020 and may perform various data processing or computations.

As at least part of the data processing or computations, the processor 1020 may load a command or data received from another component (e.g., the sensor module 1046 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). The auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. The display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. The audio module 1070 may obtain the sound via the input device 1050 or output the sound via the sound output device 1055 or a headphone of an external electronic device 1002 directly (e.g., wired) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity, sensor, or an illuminance sensor.

The interface 1077 may support one or more specified protocols to be used for the electronic device 1001 to be coupled with the external electronic device 1002 directly (e.g., wired) or wirelessly. The interface 1077 may include, for example, a high-definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. The connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. The haptic module 1079 may include, for example, a motor, a piezoelectric element, or an electrical stimulator.

The camera module 1080 may capture a still image or moving images. The camera module 1080 may include one or more lenses, image sensors, image signal processors, or flashes. The power management module 1088 may manage power supplied to the electronic device 1001. The power management module 1088 may be implemented as at least part of, for example, a power management integrated circuit (PMIC).

The battery 1089 may supply power to at least one component of the electronic device 1001. The battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. The communication module 1090 may include a wireless communication module 1092 (e.g., a cellular communication module, a short-range wireless communication module, or a GNSS communication module) or a wired communication module 1094 (e.g., a local area network (LAN) communication module or a power line communication (PLC) module). The communication module 1090 may include an LTE modem and an NR modem. A corresponding one of these communication modules may communicate with the external electronic device via the first network 1098 (e.g., a short-range communication network, such as Bluetooth™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. The antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

Commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiting such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A user equipment (UE), comprising:
a transceiver; and
a processor configured to:
    determine if a base station or another UE synchronized with the base station is detected,
    if neither the base station nor the another UE synchronized with the base station is detected, determine if a first UE that is resending a first synchronization reference signal based on a second synchronization reference signal of a second communication scheme is detected, wherein the second communication scheme is utilized in in a coexistence band of a first communication scheme and the second communication scheme, and wherein the first UE includes a modem corresponding to the first communication scheme, and
    if the first UE that is resending the first synchronization reference signal is detected, synchronize to the first UE.

2. The UE of claim 1, further comprising a modem corresponding to the second communication scheme, wherein the processor is further configured to:
    determine if a second UE that is acting as a synchronization reference UE or resending the second synchronization reference signal is detected, wherein the second UE includes a modem corresponding to the second communication scheme, and
    if the second UE that is acting as the synchronization reference UE or resending the second synchronization reference signal is detected, synchronize to the second UE.

3. The UE of claim 1, wherein the processor is further configured to:
    if the first UE that is resending the first synchronization reference signal is not detected, determine if a signal from a global navigation satellite system (GNSS) is detected, and
    if the signal from the GNSS is detected, synchronize to the GNSS.

4. The UE of claim 3, wherein the processor is further configured to:
    if the signal from the GNSS is not detected, determine if a third UE that is synchronized to the GNSS is detected, and
    if the third UE that is synchronized to the GNSS, synchronizing to the third UE that is synchronized to the GNSS.

5. The UE of claim 4, wherein the processor is further configured to:
    if the third UE that is synchronized to the GNSS is not detected, determining if a first communication scheme synchronization reference UE is detected; and
    if the first communication scheme synchronization reference UE is detected, synchronize to the first communication scheme synchronization reference UE.

6. The UE of claim 5, wherein the processor is further configured to operate the UE as a synchronization source, if the first communication scheme synchronization reference UE is not detected.

7. The UE of claim 6, wherein the processor is further configured to:
    utilize the coexistence band based on a first configuration, if the UE includes a modem corresponding to the second communication scheme, and
    refrain from using the coexistence band based on a second configuration, if the UE does not include the modem corresponding to the second communication scheme.

8. The UE of claim 5, wherein the processor is further configured to:
    determine if the first communication scheme synchronization reference UE includes a modem corresponding to the second communication scheme,
    if the first communication scheme synchronization reference UE includes the modem corresponding to the second communication scheme, utilize the coexistence band, and
    if the first communication scheme synchronization reference UE does not include the modem corresponding to the second communication scheme, utilize the coexistence band if the UE includes a modem corresponding to the second communication scheme.

9. The UE of claim 8, wherein the processor is further configured to:
    if the first communication scheme synchronization reference UE does not include the modem corresponding to the second communication scheme, and the coexistence band is utilized, monitor the coexistence band to determine if a new UE that is transmitting a synchronization reference signal is detected, wherein the new UE includes a modem corresponding to the second communication scheme, and
    if the new UE that is transmitting the synchronization signal is detected, notify the first communication scheme synchronization reference UE of the new UE.

10. The UE of claim 5, wherein the processor is further configured to refrain, based on a configuration, from using the coexistence band, if each of the first communication scheme synchronization reference UE and the UE do not include a modem corresponding to the second communication scheme.

11. The UE of claim 1, wherein the first communication scheme includes a new radio (NR) scheme, and wherein the second communication scheme includes a long term evolution (LTE) scheme.

12. The UE of claim 1, wherein the processor is further configured to:

select redundant resources for transmission of sidelink synchronization signal blocks (SSBs) in different time slots, and repeatedly transmit an SSB in the selected redundant resources, and wherein a number of repeated transmission is based on a resource pool configuration.

13. A method of synchronization performed by a user equipment (UE), the method comprising:

determining if a base station or another UE synchronized with the base station is detected;

in response to determining that neither the base station nor the another UE synchronized with the base station is detected, determining if a first UE that is resending a first synchronization reference signal based on a second synchronization reference signal of a second communication scheme is detected, wherein the second communication scheme is utilized in in a coexistence band of a first communication scheme and the second communication scheme, and wherein the first UE includes a modem corresponding to the first communication scheme; and in response to detecting the first UE that is resending the first synchronization reference signal, synchronizing to the first UE.

14. The method of claim 13, further comprising:

determining if a second UE that is acting as a synchronization reference UE or resending the second synchronization reference signal is detected, wherein the second UE includes a modem corresponding to the second communication scheme; and in response to determining that the second UE that is acting as the synchronization reference UE or resending the second synchronization reference signal is detected, synchronizing to the second UE.

15. The method of claim 13, further comprising:

in response to determining that the first UE that is resending the first synchronization reference signal is not detected, determining if a signal from a global navigation satellite system (GNSS) is detected; and in response to determining that the signal from the GNSS is detected, synchronizing to the GNSS.

16. The method of claim 15, further comprising:

in response to determining that the signal from the GNSS is not detected, determining if a third UE that is synchronized to the GNSS is detected; and in response to determining that the third UE that is synchronized to the GNSS, synchronizing to the third UE that is synchronized to the GNSS.

17. The method of claim 16, further comprising:

in response to determining that the third UE that is synchronized to the GNSS is not detected, determining if a first communication scheme synchronization reference UE is detected; and in response to determining that the first communication scheme synchronization reference UE is detected, synchronizing to the first communication scheme synchronization reference UE.

18. The method of claim 17, further comprising operating the UE as a synchronization source, in response to the first communication scheme synchronization reference UE not being detected.

19. The method of claim 18, further comprising:

utilizing the coexistence band based on a first configuration, if the UE includes a modem corresponding to the second communication scheme; or refraining from using the coexistence band based on a second configuration, if the UE does not include the modem corresponding to the second communication scheme.

20. A non-transitory computer-readable storage medium configured to store instructions that, when executed by a processor, cause a user equipment (UE) to:

determine if a base station or another UE synchronized with the base station is detected, if neither the base station nor the another UE synchronized with the base station is detected, determine if a first UE that is resending a first synchronization reference signal based on a second synchronization reference signal of a second communication scheme is detected, wherein the second communication scheme is utilized in in a coexistence band of a first communication scheme and the second communication scheme, and wherein the first UE includes a modem corresponding to the first communication scheme, and if the first UE that is resending the first synchronization reference signal is detected, synchronize to the first UE.

* * * * *